(12) United States Patent
Kawai

(10) Patent No.: US 8,944,613 B2
(45) Date of Patent: Feb. 3, 2015

(54) VIBRATING DEVICE AND IMAGING APPARATUS USING THE SAME

(71) Applicant: Olympus Imaging Corp., Shibuya-ku, Tokyo (JP)

(72) Inventor: Sumio Kawai, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 160 days.

(21) Appl. No.: 13/791,809

(22) Filed: Mar. 8, 2013

(65) Prior Publication Data

US 2013/0235458 A1    Sep. 12, 2013

(30) Foreign Application Priority Data

Mar. 9, 2012   (JP) ................................. 2012-053223

(51) Int. Cl.
| | | |
|---|---|---|
| *G02B 1/00* | (2006.01) | |
| *G02B 27/00* | (2006.01) | |
| *G03B 17/02* | (2006.01) | |
| *H04N 5/225* | (2006.01) | |
| *H04N 5/217* | (2011.01) | |

(52) U.S. Cl.
CPC ............ *G02B 27/0006* (2013.01); *G03B 17/02* (2013.01); *H04N 5/2253* (2013.01); *H04N 5/2171* (2013.01); *H04N 5/2254* (2013.01); *G03B 2205/0084* (2013.01)
USPC ...................................................... 359/508

(58) Field of Classification Search
CPC ... G02B 27/0006; G02B 26/121; G02B 26/12

USPC .............................. 359/507, 508; 348/207.99
See application file for complete search history.

(56) References Cited

U.S. PATENT DOCUMENTS

| | | | |
|---|---|---|---|
| 8,189,099 B2 | 5/2012 | Kawai | |
| 2008/0079812 A1* | 4/2008 | Yamamoto | ............... 348/207.99 |

FOREIGN PATENT DOCUMENTS

| | | |
|---|---|---|
| JP | 2004-064555 A | 2/2004 |
| JP | 2007-267189 A | 10/2007 |
| JP | 2008-228074 A | 9/2008 |
| JP | 2010-239606 A | 10/2010 |

* cited by examiner

*Primary Examiner* — Euncha Cherry
(74) *Attorney, Agent, or Firm* — Holtz, Holtz, Goodman & Chick PC

(57) ABSTRACT

A vibrating device includes a transducer including a plate-like dust-proof member and a vibration-applying member configured to vibrate the dust-proof member, a holder arranged a predetermined space apart from the dust-proof member, a sealing member configured to seal a space between the dust-proof member and the holder, and a pressing supporting member having formed therein pressing sections configured to press the dust-proof member, supporting sections for maintaining supporting of the dust-proof member or the vibration-applying member when an external force is applied to the dust-proof member, and fixing sections with respect to the holder. The pressing sections are respectively provided in positions symmetrical to each other across an imaginary axis passing a center of gravity of the transducer. Rigidity of the supporting sections is set higher than rigidity of the pressing sections.

9 Claims, 22 Drawing Sheets

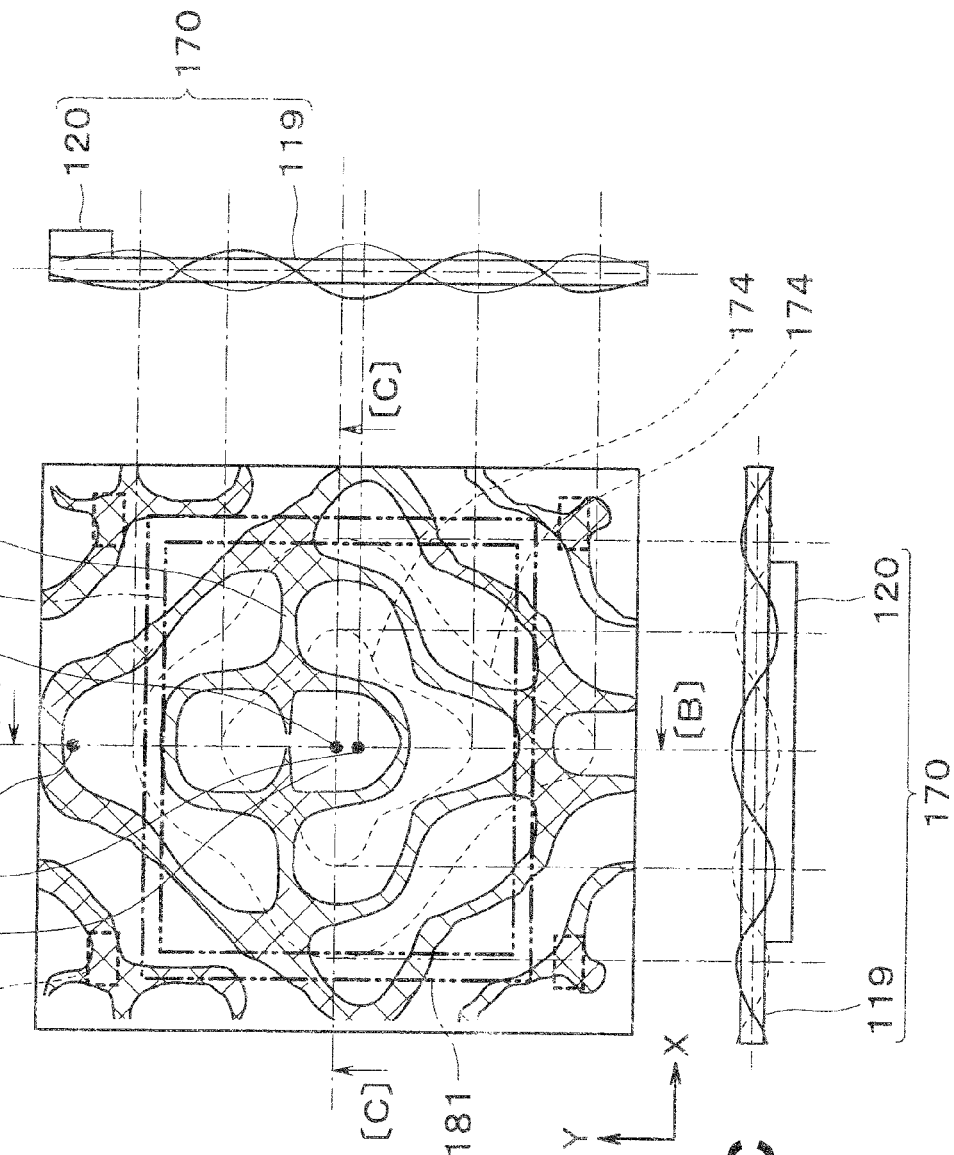

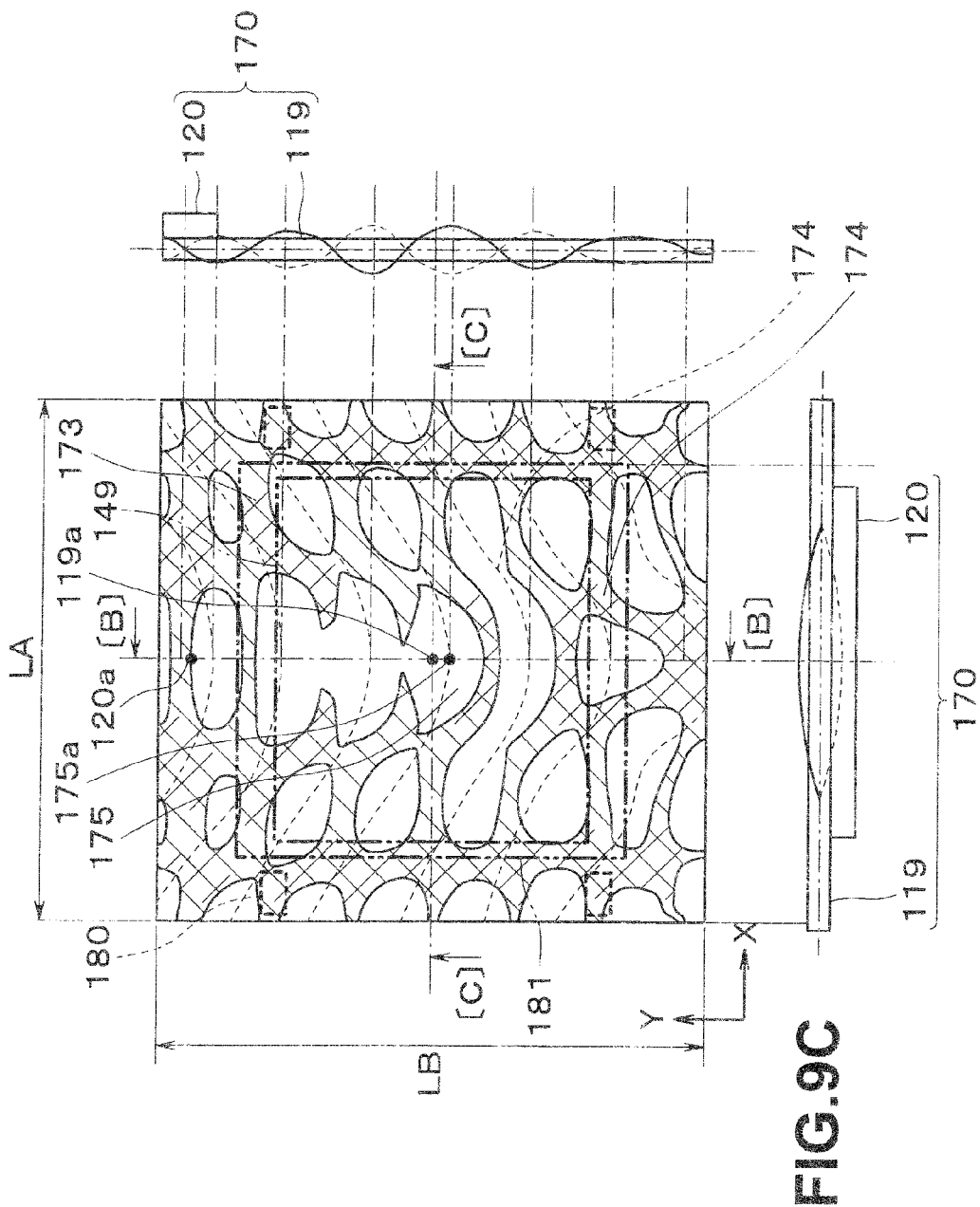

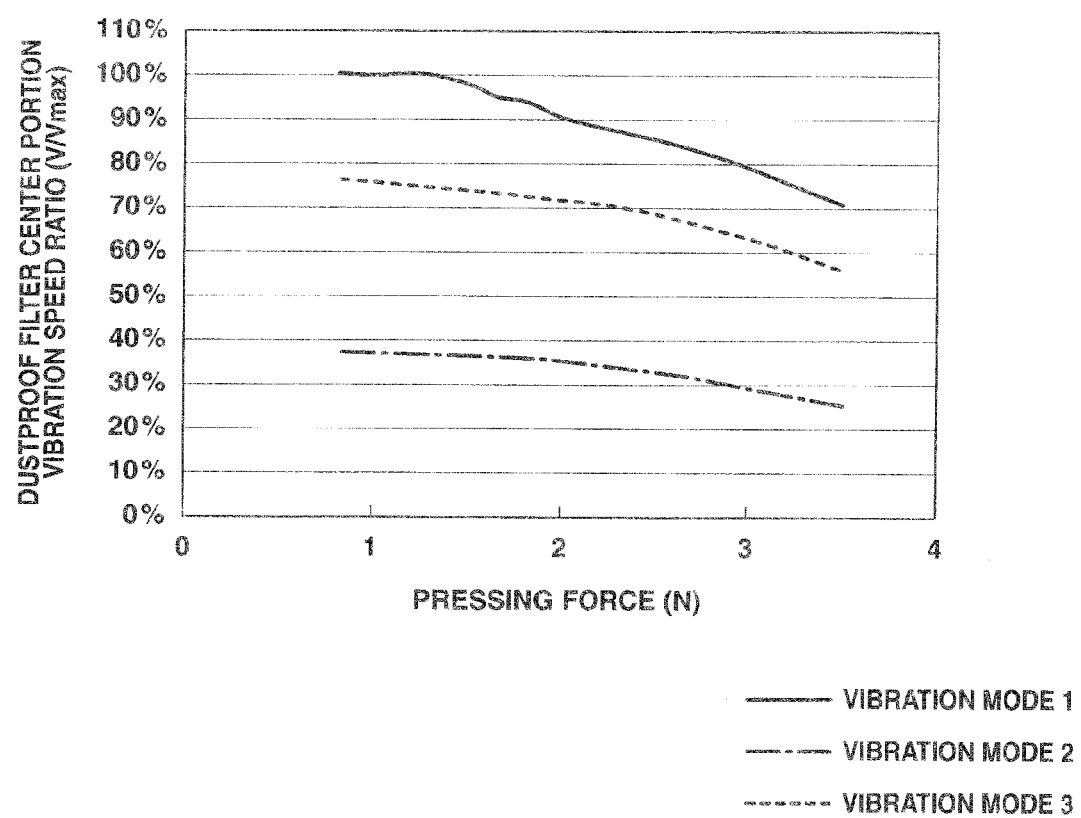

VIBRATING DEVICE AND IMAGING APPARATUS USING THE SAME

CROSS REFERENCE TO RELATED APPLICATION

This application claims the benefit of Japanese Application No 2012-053223 filed in Japan on Mar. 9, 2012, the contents of which are incorporated herein by this reference.

BACKGROUND OF THE INVENTION

1. Field of the Invention

The present invention relates to an imaging apparatus including an optical element such as an image pickup apparatus including an image pickup device that obtains an image signal corresponding to light irradiated on a photoelectric conversion surface of the image pickup device or an image projecting apparatus including a display element that displays an image to be projected on a screen and a vibrating device that vibrates a dust-proof member arranged on a front surface of the optical element in such an imaging apparatus.

2. Description of the Related Art

In recent years, quality of a generated image or a displayed image is remarkably improved in imaging apparatuses in the forms of such as an image pickup apparatus including an image pickup device and an image projecting apparatus including a display element such as liquid crystal, i.e., imaging apparatuses including optical elements such as an image pickup device and a display element. Therefore, when dust and the like adhere to the optical element arranged in a vicinity of the image pickup device or the display element, a significant problem occurs if shadows of the dust and the like are reflected on the generated image or the displayed image.

For example, in an image pickup apparatus such as a digital camera of a so-called "lens-replaceable" form configured such that a photographing optical system (a lens barrel) can be detachably attachable to an apparatus main body (a camera main body), a user can attach and detach and replace a desired photographing optical system (lens barrel) at will when the user desires. Therefore, an image pickup apparatus generally put to practical use is configured such that a plurality of kinds of photographing optical systems (lens barrels) can be selectively used for a single apparatus main body (camera main body).

In the lens-replaceable image pickup apparatus such as the digital camera of such a form, when the photographing optical system (the lens barrel) is detached from the apparatus main body (the camera main body), in some cases, dust and the like floating in an ambient environment in which the image pickup apparatus is placed intrude into an inside of the apparatus main body (the camera main body) and adhere to a surface (a light receiving surface) of the image pickup device. In other cases, dust and the like stirred up from various mechanism sections provided on the inside of the apparatus main body (the camera main body) and configured to mechanically operate, for example, various mechanism sections such as a shutter mechanism and a diaphragm mechanism during operations of the mechanism sections adhere to a surface of the image pickup device.

Likewise, in a projection type image display apparatus such as a projector configured to enlarge and project an image, which is displayed on a display element such as a CRT or liquid crystal, on a screen using a light source and a projection optical system to allow a viewer to enjoy the projected image, dust and the like sometimes adhere to a surface of the display element and shadows of the dust and the like are enlarged and projected on the screen.

In the imaging apparatuses in such forms explained above, various mechanisms for removing the dust and the like adhering to the surface of the optical element provided on the inside have been proposed.

For example, Japanese Patent Application Laid-Open Publication No. 2004-64555 discloses an electronic image pickup apparatus including a dust removing mechanism in which an annular plate-like piezoelectric element (vibration-applying member) is firmly fixed to an outer circumferential portion of a disc glass plate (a dust-proof member) and a cyclic voltage having a predetermined frequency is applied to the piezoelectric element, whereby concentric circle-like standing wave bending vibration is generated in a center of the disc glass plate to remove dust and the like adhering to the disc glass plate. Vibration generated at a predetermined excitation frequency is a standing wave having nodes in a concentric circle shape.

Supporting of the dust-proof member and dust-proof between the dust-proof member and the image pickup device are performed by a dust-proof member receiving member that is in contact with the dust-proof member in a concentric circle shape. In this case, a contact region of the dust-proof member receiving member with the dust-proof member is set to be a node of the concentric circle-like standing wave.

On the other hand, in means disclosed in Japanese Patent Application Laid-Open Publication No. 2007-267189, piezoelectric elements are respectively provided on opposed sides of a rectangular plate-like dust-proof member, the piezoelectric elements are caused to generate vibration having a predetermined frequency, and the dust-proof member is caused to resonate to set the dust-proof member in a vibration mode of a standing wave in which nodes parallel to the sides are generated. In order to remove dust and the like adhering to the nodes of the vibration, the dust-proof member is caused to resonate at different frequencies to generate a plurality of vibration modes of standing waves and change positions of the nodes. In all the vibration modes, bending vibration having nodes parallel to the sides of the dust-proof member is generated. For supporting of the dust-proof member, standing waves having different frequencies are generated such that the nodes of the vibration generally coincide with one another and vicinities of the nodes of the vibration are supported by the supporting member, whereby a vibration loss is reduced. A seal having a frame shape and a lip shape in section that prevents intrusion of dust and the like is set between an image pickup surface side and the dust-proof member.

Further, in means disclosed in Japanese Patent Application Laid-Open Publication No. 2010-239606, piezoelectric elements are respectively provided on opposed sides of a rectangular dust-proof member, the piezoelectric elements are caused to generate vibration having a predetermined frequency, and the dust-proof member is caused to resonate to generate vibration having a ridge line of a mountain of vibration surrounding a center of the dust-proof member. A pressing force of the dust-proof member at this point is set to 2 N (Newton) or less, whereby a pressing supporting structure for the dust-proof member with an extremely small vibration loss of the dust-proof member is obtained. A supporting section is provided in a member opposed to the dust-proof member. The supporting section supports nodes of vibration of the dust-proof member when an external force is simultaneously applied in a pressing direction.

Japanese Patent Application Laid-Open Publication No. 2008-228074 discloses a form in which vicinities of four corners of an optical element, which is a dust-proof member, are firmly fixed to four corners of a holding member by a conductive adhesive.

SUMMARY OF THE INVENTION

A vibrating device according to an aspect of the present invention includes: a transducer including a plate-like dust-proof member and a vibration-applying member arranged along an end side outer circumferential portion of the dust-proof member and configured to vibrate the dust-proof member; a holder arranged a predetermined space apart from the dust-proof member; a sealing member configured to seal the predetermined space between the dust-proof member and the holder; and a pressing supporting member having formed therein pressing sections configured to elastically press the dust-proof member toward the sealing member, supporting sections for maintaining supporting of the dust-proof member or the vibration-applying member when an external force is applied to the dust-proof member in a direction opposite to a direction in which the dust-proof member is pressed by an elastic force of the pressing sections, and fixing sections configured to fix the pressing supporting member to the holder. The pressing sections are respectively provided in positions symmetrical to each other across an imaginary axis passing a center of gravity of the transducer. Rigidity of the supporting sections is set higher than rigidity of the pressing sections.

Advantages of the present invention will be further clarified from the following detailed description.

BRIEF DESCRIPTION OF THE DRAWINGS

FIG. 7A is a diagram for explaining a state of vibration generated in a dust-proof filter in the vibrating device of the imaging apparatus (the digital camera) shown in FIG. 1 (a vibration mode 1) and a front view of the dust-proof filter;

FIG. 7B is a diagram for explaining the state of vibration generated in the dust-proof filter in the vibrating device of the imaging apparatus (the digital camera) shown in FIG. 1 (the vibration mode 1) and a longitudinal sectional view of the dust-proof filter;

FIG. 7C is a diagram for explaining the state of vibration generated in the dust-proof filter in the vibrating device of the imaging apparatus (the digital camera) shown in FIG. 1 (the vibration mode 1) and a cross sectional view of the dust-proof filter;

FIG. 9A is a diagram for explaining a different state of vibration generated in the dust-proof filter in the vibrating device of the imaging apparatus (the digital camera) shown in FIG. 1 (a vibration mode 3) and a front view of the dust-proof filter;

FIG. 9B is a diagram for explaining the different state of vibration generated in the dust-proof filter in the vibrating device of the imaging apparatus (the digital camera) shown in FIG. 1 (the vibration mode 3) and a longitudinal sectional view of the dust-proof filter;

FIG. 9C is a diagram for explaining the different state of vibration generated in the dust-proof filter in the vibrating device of the imaging apparatus (the digital camera) shown in FIG. 1 (the vibration mode 3) and a cross sectional view of the dust-proof filter;

FIG. 23 is a graph showing a pressing force applied to a dust-proof filter and a vibration-speed ratio of a center portion of the dust-proof filter in the vibrating device of the present invention.

DETAILED DESCRIPTION OF THE PREFERRED EMBODIMENTS

The present invention is explained below with reference to embodiments shown in the figures.

First Embodiment

According to a first embodiment of the present invention, there is provided an imaging apparatus including an image pickup device unit configured to obtain an image signal through photoelectric conversion and a vibrating device configured to perform dust removal for the image pickup device unit. The first embodiment is illustration of application of the imaging apparatus to a lens-replaceable digital camera.

Figure 1:
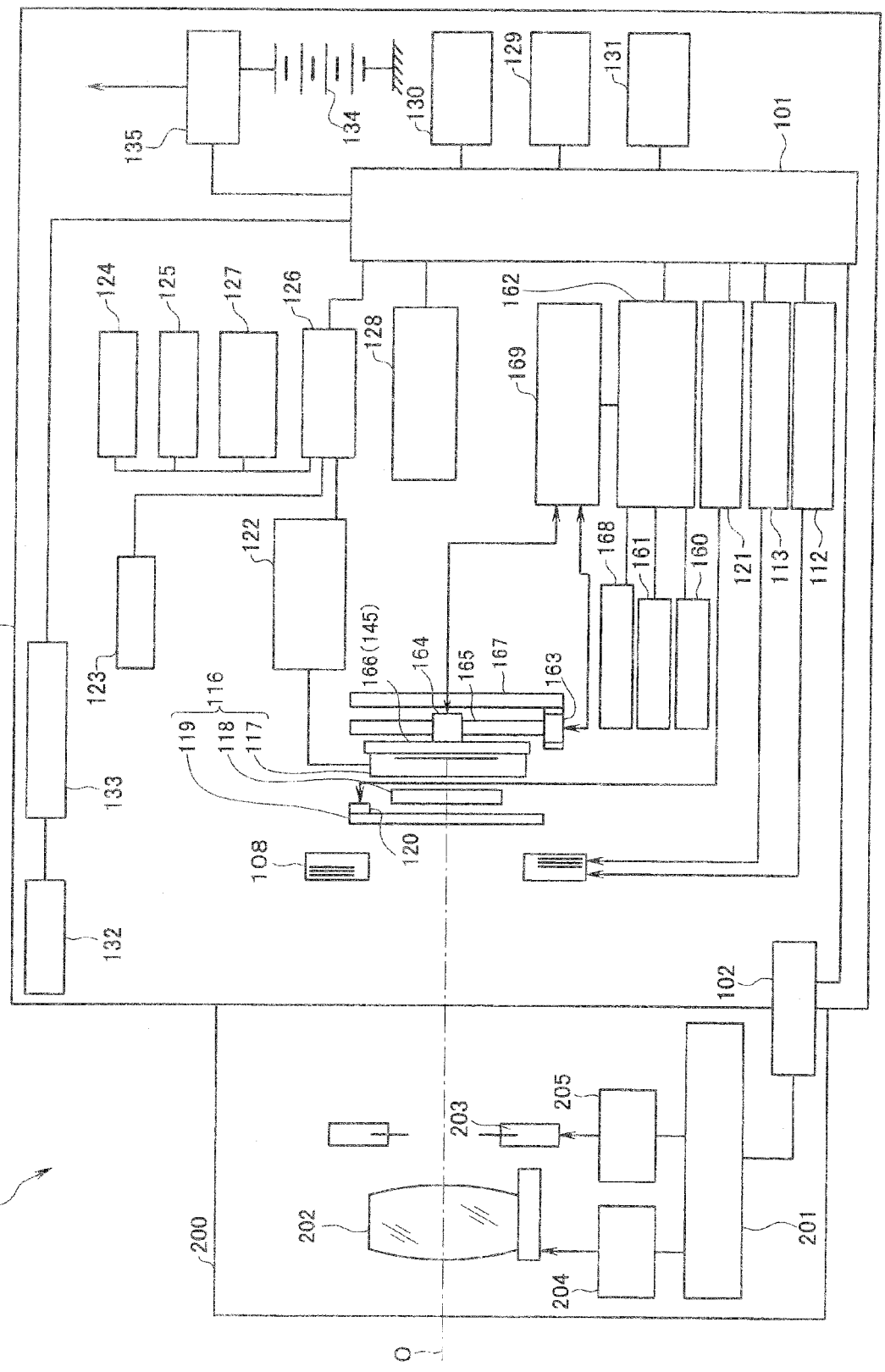
FIG. 1 is a block configuration diagram schematically showing mainly an electric configuration of an imaging apparatus (a digital camera) according to a first embodiment of the present invention.
Figure 2A:
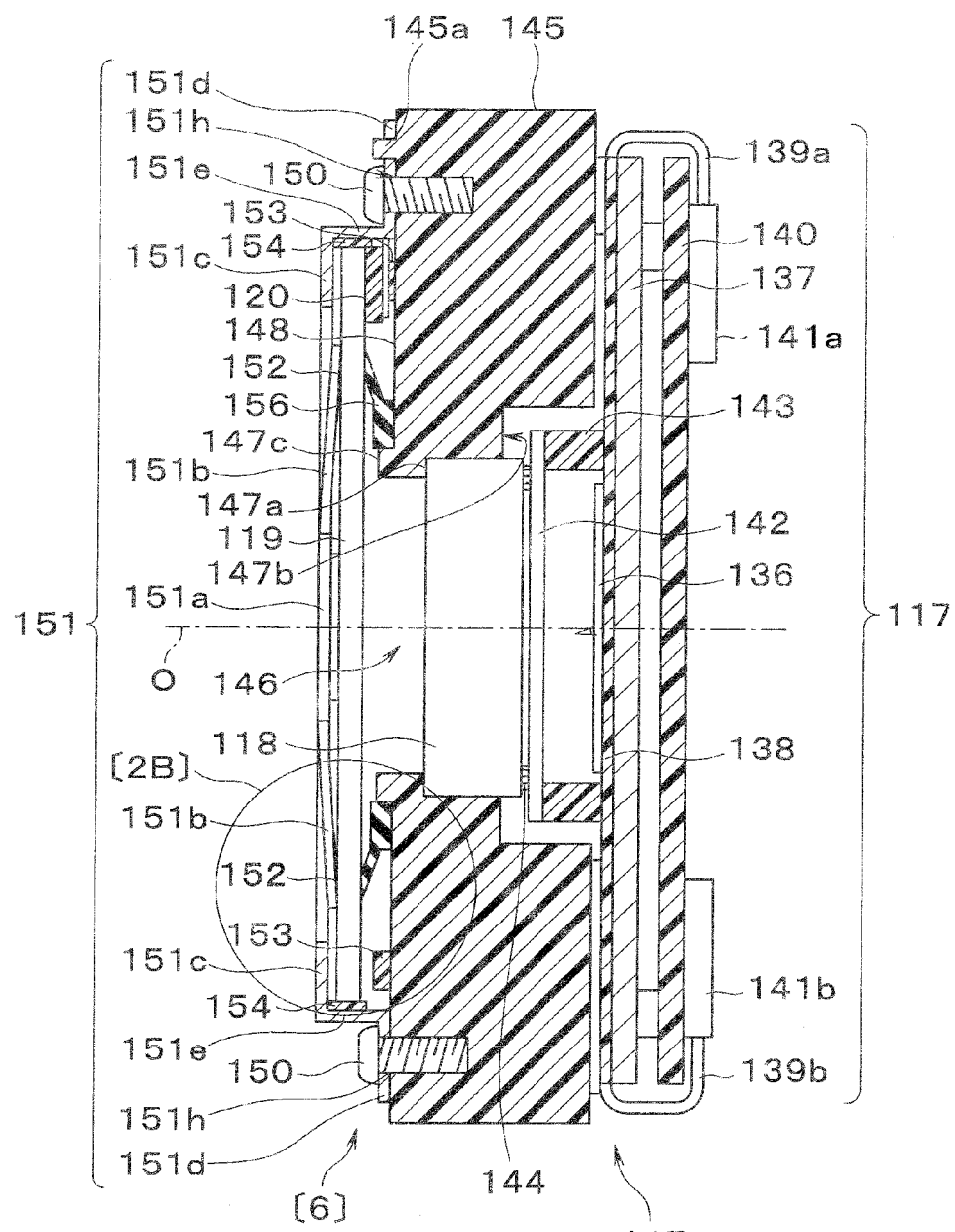
FIG. 2A is a sectional view showing a cross section (a cross section taken along line [2]-[2] in FIG. 3) of an image pickup device unit including a vibrating device in the imaging apparatus (the digital camera) shown in FIG. 1.
Figure 2B:
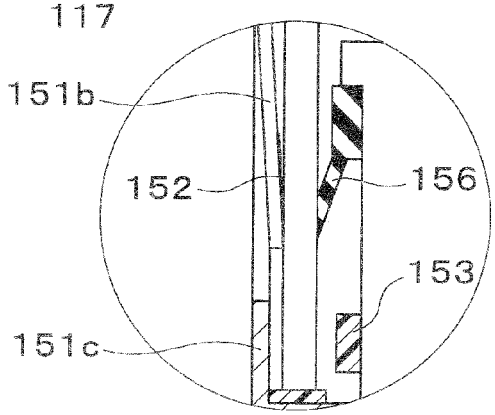
FIG. 2B is a main part enlarged view showing the region indicated by [2B] in FIG. 2A in an enlarged manner.
Figure 3:
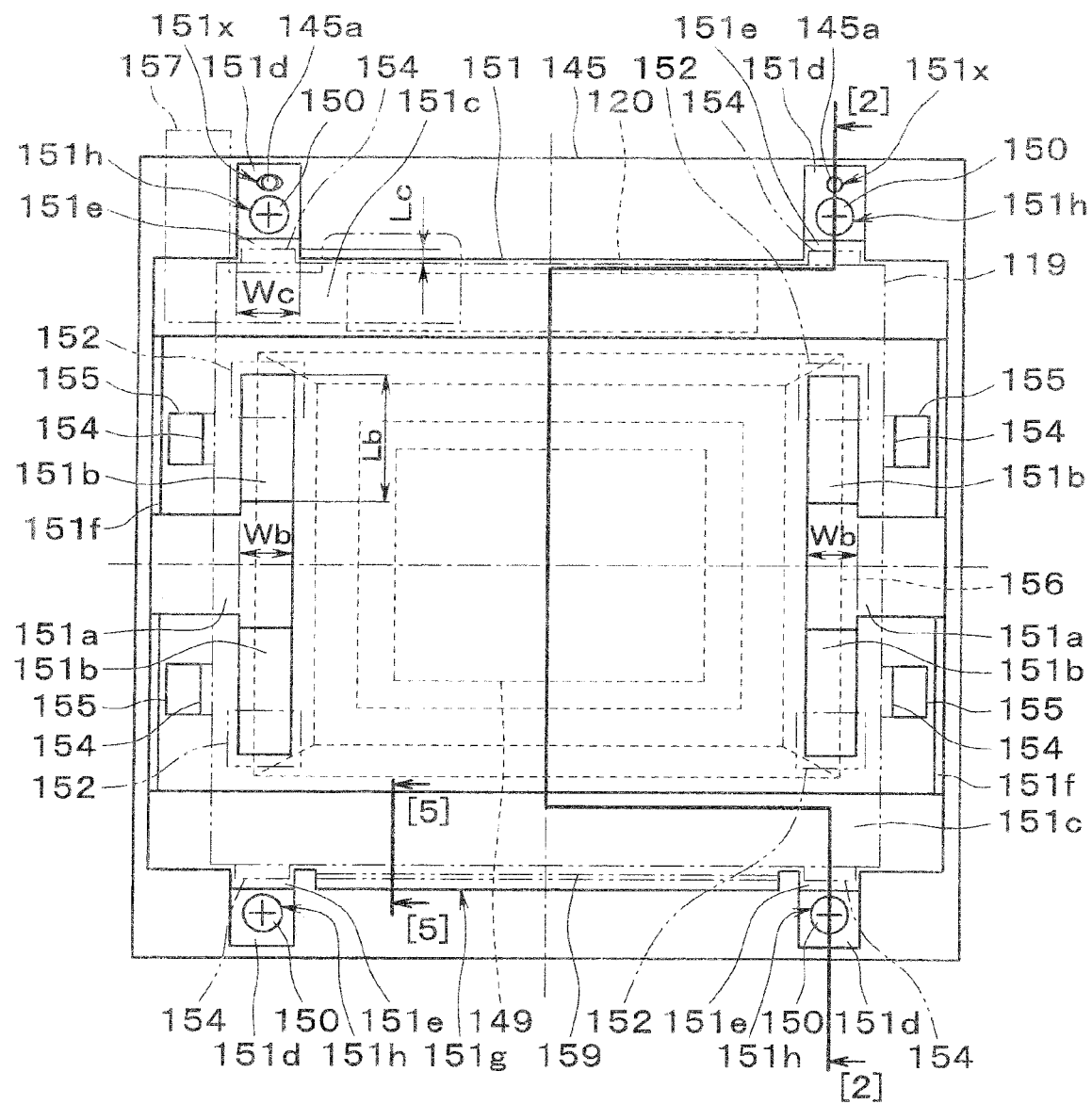
FIG. 3 is a front view of the image pickup device unit including the vibrating device shown in FIG. 2A.

FIGS. 1 to 18 are figures for explaining a configuration of the imaging apparatus according to the first embodiment of the present invention. Among the figures, FIG. 1 is a block configuration diagram schematically showing mainly an electric configuration in the imaging apparatus (the digital camera) according to the present embodiment. FIG. 2A is a sectional view of the image pickup device unit including the vibrating device in the imaging apparatus (the digital camera) shown in FIG. 1. FIG. 2A shows a cross section taken along line [2]-[2] in FIG. 3. FIG. 2B is an enlarged view of the region indicated by [2B] in FIG. 2A. FIG. 3 is a front view of the image pickup device unit including the vibrating device shown in FIG. 2A. First, a schematic configuration of the digital camera, which is the imaging apparatus according to the present embodiment, is explained below with reference to FIGS. 1 to 3.

In the present embodiment, an optical axis of a photographing optical system in a lens barrel is represented by a sign O. In a direction along the optical axis O, a side where an object opposed to a front surface of the camera is present is referred to as front and a side where a light receiving surface (an image forming surface) of an image pickup device arranged on a rear surface side of the camera is present is referred to as back.

In the respective drawings used for the following explanation, each of components is sometimes shown in a different scale in order to show the respective components in sizes recognizable on the drawings. Therefore, in the present invention, numbers of the components shown in the drawings, shapes of the components, ratios of sizes of the components, and a relative positional relation among the respective components are not limited to only forms shown in the figures.

First, a schematic configuration of the entire digital camera according to the present embodiment is explained with reference to FIG. 1.

As shown in FIG. 1, a digital camera 10 includes a body unit 100 functioning as a camera main body and a lens unit 200 functioning as a replaceable lens barrel, which is one of accessory devices.

The lens unit 200 is a lens barrel configured to be detachably attachable to the body unit 100 via a not-shown lens mount provided on a front surface of the body unit 100. Control of the lens unit 200 is performed by a microcomputer for lens control (hereinafter referred to as "Lucom") 201 included in the lens unit 200. Control of the body unit 100 is performed by a microcomputer for body control (hereinafter referred to as "Bucom") 101. The Lucom 201 and the Bucom 101 are electrically connected to be capable of communicating with each other via a communication connector 102 in a state in which the lens unit 200 is attached to the body unit 100. The Lucom 201 is configured to operate as a camera system while cooperating with the Bucom 101 in a subsidiary manner.

The lens unit 200 includes a taking lens 202 and a diaphragm 203 that configure a photographing optical system. The taking lens 202 is driven by a not-shown stepping motor provided in a lens driving mechanism 204. The diaphragm 203 is driven by a not-shown stepping motor provided in a diaphragm driving mechanism 205. The Lucom 201 controls the respective motors on the basis of a command of the Bucom 101.

Constituent members explained below are disposed in the body unit 100 as shown in the figure. For example, a shutter 108 of a focal plane type is provided on the optical axis O. A shutter charge mechanism 112 configured to charge a spring for driving a front curtain and a rear curtain of the shutter 108 and a shutter control circuit 113 configured to control movement of the front curtain and the rear curtain are provided.

On the optical axis O, an image pickup unit 116 for photoelectrically converting an object image passed through the taking lens 202 is provided. The image pickup unit 116 is configured by integrating, as a unit, a CCD 117, which is an image pickup device functioning as an image forming device, an optical low-pass filter (LPF) 118 disposed on a front surface of the CCD 117, and a dust-proof filter 119, which is a plate-like dust-proof member. On one side of a peripheral edge portion of the dust-proof filter 119, a piezoelectric element 120, which is a vibration-applying member, configured to vibrate the dust-proof member is attached and arranged along, for example, an end outer peripheral edge. The piezoelectric element 120 includes two electrodes (171 and 172; see FIG. 4). The piezoelectric element 120 is vibrated by the dust-proof filter control circuit 121, which is driving means, at a predetermined frequency decided by a dimension and a material of the dust-proof filter 119 to generate predetermined vibration in the dust-proof filter 119. Consequently, dust adhering to a filter surface can be removed.

An anti-vibration unit for camera-shake correction is added to the image pickup unit 116. The dust-proof filter 119 is formed by a transparent thin plate-like member formed in a polygonal shape as a whole. As the dust-proof filter 119 in the present embodiment, a dust-proof filter formed in a substantially square shape is illustrated.

The anti-vibration unit for camera-shake correction includes an X-axis gyro 160, a Y-axis gyro 161, an anti-vibration control circuit 162, an X-axis actuator 163, a Y-axis actuator 164, an X frame 165, a Y frame 166 (corresponding to a holder 145 explained below), a frame 167, a position detection sensor 168, and an actuator driving circuit 169 and the like. A detailed configuration of the anti-vibration unit for camera-shake correction is explained below.

The body unit 100 in the digital camera 10 according to the present embodiment includes a CCD interface circuit 122 connected to the CCD 117, a liquid crystal monitor 123, which is a display device, an SDRAM 124 functioning as a storage region, a Flash ROM 125, and an image processing controller 126 configured to perform image processing using the liquid crystal monitor 123, the SDRAM 124, the Flash ROM 125, a recording medium 127, and the like. The body unit 100 is configured to be capable of providing an electronic recording and displaying function together with an electronic image pickup function.

As the electronic image pickup function, the body unit 100 has a so-called through-image display function for simultaneously displaying images photographed by the CCD 117 on the liquid crystal monitor 123 as a moving image and using the display as an image finder for object observation and a moving image recording function for recording the moving image. As means for realizing a finder function, an optical finder unit or the like may be further provided.

The recording medium 127 is an external recording medium such as various memory cards or an external HDD. The recording medium 127 is mounted to be capable of communicating with the Bucom 101 of the body unit 100 via the image processing controller 126 and detachably attachable to the body unit 100. Image data obtained by a photographing action is recorded in the recording medium 127. As another storage region, a nonvolatile memory 128 configured to store predetermined control parameters necessary for camera control and configured by, for example, an EEPROM is provided to be accessible from the Bucom 101.

An LCD for operation display 129 and an LED for operation display 130 for informing a user of an operation state of the digital camera 10 through a display output, a camera operation SW 131, a strobe 132, a strobe control circuit 133 configured to drive the strobe 132, and a power supply circuit 135 are connected to the Bucom 101.

In the LCD for operation display 129 or the LED for operation display 130, a display section configured to display a vibration operation of the dust-proof filter 119 in a period in which the dust-proof filter control circuit 121 is operating is provided.

The camera operation SW 131 includes a plurality of operation members necessary for operating the digital camera 10 such as a release SW, a mode changing SW, and a power SW and a plurality of switch groups associated with the operation members.

A battery 134 functioning as a power supply is connected to the power supply circuit 135. The power supply circuit 135 is a circuit configured to convert a voltage of the battery 134 into a voltage required by respective circuit units included in the digital camera 10 and supply the voltage to the circuit units. The power supply circuit 135 includes a voltage detecting circuit (not shown in the figure) configured to detect a voltage change at a time when an electric current is supplied from an external power supply via a not-shown connection terminal (a jack).

The respective components of the digital camera 10 configured as explained above schematically operates as explained below. First, the image processing controller 126 controls the CCD interface circuit 122 according to a command of the Bucom 101 and captures image data from the CCD 117. The image data is converted into a video signal by the image processing controller 126 and outputted to and displayed on the liquid crystal monitor 123. The user can check a finder image or a photographed image using an image displayed on the liquid crystal monitor 123.

The SDRAM 124 is a temporary storage memory for the image data. The SDRAM 124 is used as a work area or the like when the image data is converted. The image data temporarily stored in the SDRAM 124 is kept in the recording medium 127 after being converted into JPEG data or the like (in the case of still image data) or MPEG data or the like (in the case of moving image data) by the image processing controller 126 under control by the Bucom 101.

Focusing of the taking lens 202 is performed by, while sequentially changing a position on the optical axis O of the taking lens 202, every time the position is changed, picking up an image with the CCD 117, calculating, with the image processing controller 126 and the Bucom 101, a position having highest contrast of the acquired picked-up image, transmitting the position to the Lucom 201 through the communication connector 102, and the Lucom 201 subjecting the taking lens 202 to position control. As photometry, well-known photometry processing is performed on the basis of a light amount detected from the picked-up image.

A configuration of the image pickup unit 116 including the CCD 117 is explained below with reference to FIGS. 2A, 2B and 3.

As mainly shown in FIG. 2A, the image pickup unit 116 includes the CCD 117 functioning as an image pickup device configured to obtain an image signal corresponding to light transmitted through the photographing optical system (the taking lens 202; see FIG. 1) and irradiated on a photoelectric conversion surface of the CCD 117, the optical LPF 118 disposed on a front surface on the photoelectric conversion surface side of the CCD 117 and configured to remove a high-frequency component from an object light beam irradiated while being transmitted through the photographing optical system, the dust-proof filter 119, which is a dust-proof member, arranged to be opposed to and a predetermined space apart from to the optical LPF 118 on a front surface side of the optical LPF 118, and the piezoelectric element 120, which is a vibration-applying member, disposed in a peripheral edge portion of the dust-proof filter 119 and for applying predetermined vibration to the dust-proof filter 119.

In the digital camera 10 according to the present embodiment, a configuration in which one piezoelectric element 120 is attached along one side of the dust-proof filter 119 is illustrated. However, the piezoelectric element 120 is not limited to this form. For example, a plurality of piezoelectric elements may be arranged along respective opposed sides or respective orthogonal sides of the dust-proof filter 119.

The CCD 117 includes a CCD chip 136, a fixed plate 137, a flexible board 138 disposed on the fixed plate 137 and mounted with the CCD chip 136, connecting members 139a and 139b extended from both ends of the flexible board 138, a main circuit board 140 mounted with connectors 141a and 141b to which the connecting members 139a and 139b are connected, a protection glass 142 arranged to be opposed to and a predetermined space apart from the CCD chip 136 on a front surface side of the CCD chip 136, and a spacer 143 firmly fixed on the flexible board 138 and configured to support a peripheral edge portion of the protection glass 142 and the like. Although not shown in FIG. 2A, circuits such as an interface circuit 122 are provided on the main circuit board 140.

A filter receiving member 144 formed of an elastic member or the like is disposed between the CCD 117 and the optical LPF 118. The filter receiving member 144 is disposed in a front surface side peripheral edge portion of the CCD 117 and a position avoiding an effective range of the photoelectric conversion surface and arranged in contact with a vicinity of a rear surface side peripheral edge portion of the optical LPF 118. Consequently, the filter receiving member 144 plays a role for keeping airtightness between the CCD 117 and the optical LPF 118.

The front surface side and the peripheral edge portion of the CCD 117 and the optical LPF 118 are covered by a holder 145. Consequently, the CCD 117 and the optical LPF 118 are hermetically covered with respect to an outer surface by the holder 145.

The holder 145 is configured to include a rectangular opening 146 (see FIG. 2A) in a substantially center portion around the optical axis O. In an inner peripheral edge portion of the opening 146 closer to the dust-proof filter 119, a first step portion 147a (see FIG. 2A) formed in a substantial L shape in section and expanding backward and a second step portion 147b formed in a substantial L shape in section and expanding further backward from the first step portion 147a. The first step portion 147a forms a space in which the optical LPF 118 is arranged. The second step portion 147b forms a space in which the CCD 117 is arranged.

That is, the optical LPF 118 and the CCD 117 are inserted into the holder 145 from a rear side of the holder 145 toward a side of the opening 146, whereby the optical LPF 118 and the CCD 117 are respectively disposed in predetermined regions. A front surface side peripheral edge portion of the optical LPF 118 is arranged in contact with the first step portion 147a, whereby the optical LPF 118 and the CCD 117 are set in a substantially hermetically sealed state. Further, the optical LPF 118 is subjected to position regulation in the optical axis O direction by the first step portion 147a and, at the same time, disposed not to slip off from an inside of the holder 145 toward the front surface side.

On the other hand, a dust-proof filter receiving section 148 for holding the dust-proof filter 119 a predetermined space apart from the optical LPF 118 on the front surface side of the optical LPF 118 is formed over an entire periphery in the peripheral edge portion of the opening 146 of the holder 145. On the optical axis O, the dust-proof filter receiving section 148 is formed in a region closer to the front surface side than the first step portion 147a to form a plane orthogonal to the optical axis O. An opening portion formed on an inner peripheral side of the dust-proof filter receiving section 148 is formed as a passing area 149 (see FIG. 3) for a light beam transmitted through the photographing optical system, i.e., a focused beam.

A third step portion 147c is formed over an entire periphery in an inner peripheral edge portion on a front surface side of the dust-proof filter receiving section 148. An inner peripheral portion of an annular seal 156 formed of a flexible material such as rubber is fit and positioned in an outer peripheral portion of the third step portion 147c. A lip portion expanding in a square pyramid shape toward an outer side, extending forward at a distal end, and formed in an annular shape is provided in the seal 156. A predetermined region on a rear surface side of the dust-proof tilter 119 is pressed against and in contact with the lip portion distal end. Consequently, a space between a front surface of the optical LPF 118 and a rear surface of the dust-proof filter 119 is maintained in a substantially hermetically sealed state. That is, the seal 156 functions as a sealing member for sealing a predetermined space between the dust-proof member (the dust-proof filter 119) and the holder 145. The dust-proof member (the dust-proof filter 119) and the holder 145 are arranged a predetermined space apart from each other.

On a front surface side of the dust-proof filter 119, a pressing and supporting member (hereinafter simply referred to as pressing member) 151 having an opening portion 119b for allowing photographing light to pass and formed of a plate-like elastic member formed annularly along an edge of the opening portion 119b is disposed to cover an outer peripheral edge portion of the dust-proof filter 119. In the present embodiment, the pressing member formed of the plate-like elastic member is formed in a substantially square frame-like annular shape. However, the pressing member formed of a plate-like elastic member may be formed in any shape as long as the opening portion 119b for allowing the photographing light to pass and a portion annularly formed along the edge of the opening portion 119b. That is, the pressing member may be formed in an arc shape or may be formed in an arc shape in which a part of a liner portion shown in FIG. 10 explained below is formed. The pressing member 151 is a component formed by applying sheet metal bending to a thin plate of metal such as stainless steel, phosphor bronze, or beryllium copper.

The pressing member 151 is formed to include supporting sections 151c arranged to be opposed to each other on two opposed sides of the outer peripheral edge portion of the dust-proof filter 119, a first standing bent section 151e formed to be bent backward in a direction orthogonal to supporting surfaces of the supporting sections 151c, a plurality of fixing sections 151d (in the present embodiment, four places; see FIG. 3) formed in a part of the first standing bent section 151e, arms 151b, which are pressing sections, arranged to be opposed to each other on the other two sides of the outer peripheral edge portion of the dust-proof filter 119 and configured to elastically press the dust-proof filter 119 from the front surface side toward the seal 156 (the sealing member) in the back (i.e., in the optical axis O direction (a Z direction)), an arm supporting section 151a configured to elastically support the arms 151b, and a second standing bent section 151f formed to be bent backward in a direction orthogonal to a supporting surface of the arm supporting section 151a.

The supporting sections 151c are formed on the two opposed sides among four sides of the substantially square frame shape. The supporting sections 151c are arranged to be opposed to each other at a predetermined space from the two opposed sides of the outer peripheral edger portion of the dust-proof filter 119 to form a surface parallel to the dust-proof filter 119. The supporting sections 151c are formed in a substantially rectangular shape having long sides in a direction along the outer peripheral edge portion of the dust-proof filter 119.

The plurality of fixing sections 151d are regions formed to fix the pressing member 151 to a surface of the dust-proof filter receiving section 148 of the holder 145. Therefore, the plurality of fixing sections 151d are arranged generally in vicinities of four corner portions of the pressing member 151 and formed to extend outward along the surface of the dust-proof filter receiving section 148 of the holder 145 in a state in which a part of the first standing bent section 151e is bent to an outer side. Screw holes 151h are drilled in the plurality of fixing sections 151d. Consequently, the pressing member 151 is fixed to and supported by the dust-proof filter receiving section 148 using screws 150 disposed via the screw holes 151h of the fixing sections 151d. In a part (in the present embodiment, two fixing sections) of the plurality of fixing sections 151d, hole sections 151x in which two positioning pins 145a projected outward from the dust-proof filter receiving section 148 are fit are formed. One of the two hole sections 151x is formed as a round hole and the other is formed as a long hole. That is, when the pressing member 151 is fixed to and supported by the dust-proof filter receiving section 148, the two positioning pins 145a of the dust-proof filter receiving section 148 are respectively fit in the two hole sections 151x, whereby the pressing member 151 is positioned. In this case, the one hole section 151x is formed as the long hole in order to absorb dimension errors (pin positions, hole positions, etc.) in manufacturing the member.

The arms 151b are formed in one set of two sets of sides opposed to each other among the four sides of the substantially square frame shape. The arms 151b are arranged in positions symmetrical to each other across an imaginary axis passing a center of gravity of the dust-proof member and a center of gravity of the vibration-applying member and in the outer peripheral edge portion of the dust-proof filter 119. The positions are positions where rotation moments of the imaginary axis passing the center of gravity of the dust-proof member are balanced. Each of the arms 151b includes a center portion that forms a parallel surface to the dust-proof filter 119 and a leaf spring-like pressing portion that elastically press the outer peripheral edge of the dust-proof filter 119. The center portion and the pressing portion are formed in a substantially rectangular shape having long sides in a direction along the outer peripheral edge of the dust-proof filter 119. Since a distal end side of the leaf spring-like pressing portion is bent to a side of the dust-proof filter 119, the leaf spring-like pressing portion elastically presses the outer peripheral edge of the dust-proof filter 119. The arm supporting section 151a is formed to extend from a substantially center portion of the arms 151b to an outer side of the dust-proof filter 119 along an imaginary line perpendicular to an imaginary line passing through a center of gravity of the dust-proof filter 119. Therefore, when the pressing member 151 is viewed from the front surface side (see FIG. 3), a shape formed by the arm supporting section 151a and the arms 151b is a substantial T shape. The pressing member 151 is cantilever-supported by the second standing bent section 151f such that this substantial T-shaped portion is parallel to the dust-proof filter 119 when viewed from the front surface side shown in FIG. 3. That is, the arms 151b are integrally connected to a distal end region of the arm supporting section 151a and the second standing bent section 151f is integrally connected to a proximal end region of the arm supporting section 151a. With this configuration, the arms 151b are formed to press the two side opposed to each other of the peripheral edge portion of the dust-proof filter 119 backward from the front surface side, i.e., in the direction along the optical axis O (the Z direction).

On the other hand, a surface on the rear surface side of the dust-proof filter 119, i.e., a side opposed to the optical LPF 118 is supported by the dust-proof filter receiving section 148 via the seal 156. The seal 156 is formed of a material having elasticity.

Elastic receiving members 152 made of a plate-like material having elasticity with a vibration damping property such as rubber or resin, i.e. a vibration absorptive material are provided in both distal end region of the arms 151b of the pressing member 151. Consequently, the receiving members 152 are interposed between the pressing member 151 and the dust-proof filter 119. When vibration of the dust-proof filter 119 is directly transmitted to the pressing member 151, in some cases, unnecessary vibration occurs in the pressing member 151 to prevent the vibration of the dust-proof filter 119 or generate audible sound. The vibration is prevented from being transmitted to the pressing member 151 by inserting a sheet of a resin material or a rubber material having a vibration absorbing property between the dust-proof filter 119 and the pressing member 151.

Supporting members 154 made of a material same as the receiving members 152 are disposed on an inner wall surface of the first standing bent section 151e of the pressing member 151. Two end faces among outer peripheral end faces of the dust-proof filter 119 are arranged in contact with the supporting members 154. Consequently, the dust-proof filter 119 is positioned in a Y direction.

On the other hand, as shown in FIG. 3, in the holder 145, supporting sections 155 formed to project from the dust-proof receiving section 148 toward the front surface are provided. A pair of the supporting sections 155 is respectively formed on both sides of the pressing member 151 to hold the respective arm supporting sections 151a of the pressing member 151. The supporting members 154 are provided on inner wall surfaces of the supporting sections 155 as well. The other two end faces among the outer peripheral end faces of the dust-proof filter 119 are arranged in contact with the supporting members 154. Consequently, the dust-proof filter 119 is positioned in an X direction. The supporting members 154 are also formed of a material with a vibration damping property such as rubber or resin to prevent the supporting members 154 from hindering vibration of the dust-proof filter 119.

In the configuration of the present embodiment, it is unnecessary to set disposing positions of the receiving members 152 (i.e. a pressing position of the dust-proof filter 119) to be node positions (explained below) of vibration generated in the dust-proof filter 119. However, if arrangement of the receiving members 152 is set in the node positions of the vibration, the vibration of the dust-proof filter 119 is not hindered even if a pressing force is increased. Therefore, it is possible to configure a dust removing mechanism having large vibration amplitude and high efficiency.

As explained above, the seal 156 including the annular lip portion is interposed between the peripheral edge portion of the dust-proof filter 119 and the dust-proof filter receiving section 148. The lip portion is arranged in contact with the dust-proof filter 119. Consequently, the seal 156 supports the dust-proof filter 119 from the rear surface side and hermetically seals a space including the opening 146.

When a position where the annular lip portion supports the dust-proof filter 119 is set in the node position (explained below) of vibration generated in the dust-proof filter 119, the vibration of the dust-proof filter 119 is hardly hindered even if the pressing force is increased. Therefore, naturally, it is possible to configure a dust removing mechanism having large vibration amplitude and high efficiency.

By setting the pressing force of the dust-proof filter 119 to 2 N (Newton) or less, the vibration of the dust-proof filter 119 is hardly hindered even if the node position of the vibration is not pressed and supported by the pressing member 151 or the seal 156.

According to the configuration explained above, the image pickup unit 116 in the digital camera 10 according to the present embodiment includes the holder 145 formed in a desired size and is configured to form a hermetically sealed structure around the CCD 117.

On the other hand, in the dust-proof filter receiving section 148, receiving members 153 made of a material same as the receiving members 152 are arranged in regions opposed to the respective receiving members 152. The receiving members 153 are disposed as members that receive the rear surface side of the dust-proof filter 119 when an external force in a pressing direction of the pressing member 151 (the optical axis O direction (the Z direction) and from the front surface to the back) is applied to the dust-proof filter 119 and a plane position of the dust-proof filter 119 is displaced.

Further, the supporting sections 151*c* of the pressing member 151 are members that receive the dust-proof filter 119 when an external force in a counter-pressing direction is applied to the dust-proof filter 119 and the plane position of the dust-proof filter 119 is displaced.

Since the supporting sections 151*c* are formed in vicinities of the fixing sections 151*d*, a distance of the force in the counter-pressing direction to a position where an inner wall of the first standing bent section 151*e* and an external shape of the dust-proof filter 119 are in contact is extremely short. A spring constant in a bending direction of the supporting sections 151*c* that support the dust-proof filter 119 is extremely large. Therefore, even if the dust-proof filter 119 receives a large force in the counter-pressing direction, it is possible to suppress displacement of the dust-proof filter 119 to be extremely small. A maximum displacement amount of the arms 151*b* is a predetermined displacement amount that generally coincides with a space between the front surface of the dust-proof filter 119 and the supporting sections 151*c*. That is, although rigidity of the arms 151*b* is low, a spring constant of the arms 151*b* is also small, and the arms 151*b* tend to be deformed, since the displacement is suppressed to a predetermined small value, it does not occur that the dust-proof filter 119 is greatly displaced and damaged by an external force and the dust-proof filter 119 comes off. Moreover, since the supporting sections 151*c* are formed integrally with the pressing member 151 and formed in a plate shape, a necessary space of the pressing member 151 hardly changes from a space of a dust-proof member pressing mechanism in the past.

If the pressing member 151 shown in FIG. 3 is a metal plate such as a phosphor bronze plate for a spring, a beryllium copper plate for a spring, or a stainless steel plate for a spring or a resin material having high bending strength and the arms 151*b* have plate thickness t, a Yong's modulus E, width Wb, and length Lb (expansion length), a spring constant kb of the arms 151*b* is represented by the following equation:

$$kb = 1/4 \cdot (E \cdot Wb \cdot t^3)/Lb^3$$

On the other hand, if the supporting sections 151*c* are assume to be simple cantilevers and the cantilevers have width Wc, length Lc, plate thickness t, and a Young's modulus E, a spring constant kc of the supporting sections 151*c* is represented by the following equation:

$$kc = 1/4 \cdot (E \cdot Wc \cdot t^3)/Lc^3$$

The supporting sections 151*c* shown in FIG. 3 are not the simple cantilevers and have a spring constant larger than a value of the above equation. However, to simplify explanation, the supporting sections 151*c* are assumed to be the cantilevers and kc is calculated as a minimum spring constant.

In the above two equations, if Wb≈Wc, a ratio kc/kb of the respective spring constants kb and kc is calculated as follows:

$$kc/kb = 1/(Lc/Lb)^3$$

The ratio is inversely proportional to a cube of a ratio of the length Lb and Lc of the respective cantilevers.

Further, specifically, if Lb is 5 mm and Lc is 0.5 mm, a ratio kc/kb of the spring constants is 1000. Therefore, the supporting sections 151*c* have a spring constant 1000 times as large as the spring constant of the arms 151*b*. It may be considered that rigidity increases as deformation with respect to a predetermined force is small and a ratio of rigidities is proportional to the spring constants. Therefore, rigidity of the supporting sections 151*c* is 1000 times as high as the rigidity of the arms 151*b*.

Further, a flexible printed board 157 including a conductive pattern is electrically connected to an end portion of the piezoelectric element 120, which is the vibration-applying member. The flexible printed board 157 is provided to input a predetermined electric signal (explained below) from the dust-proof filter control circuit 121 to the piezoelectric element 120. Consequently, the piezoelectric element 120 receives a control signal of the dust-proof filter control circuit 121 and generates predetermined vibration. The flexible printed board 157 is formed of resin, copper foil, and the like. Since the flexible printed board 157 has flexibility, it is less likely that the flexible printed board 157 damps the vibration of the piezoelectric element 120. However, it is possible to further suppress the damping of the vibration by providing the piezoelectric element 120 in a place where vibration amplitude is small (a node position of vibration explained below).

On the other hand, the digital camera 10 according to the present embodiment includes an anti-vibration unit for camera-shake correction (hereinafter referred to as camera-shake correcting mechanism) having a configuration explained below. In this case, the piezoelectric element 120 moves relatively to the body unit 100. Therefore, when the dust-proof filter control circuit 121 is provided integrally with the body unit 100, the flexible printed board 157 that electrically connects the dust-proof filter control circuit 121 and the piezoelectric element 120 is deformed according to operation of the camera-shake correcting mechanism. A position of the flexible printed board 157 is displaced. In this case, since the flexible printed board 157 is formed of a thin material having flexibility, the flexible printed board 157 is effective for reducing a load during the operation of the hand shake correcting mechanism and reducing a size of the hand shake correcting mechanism. Further, in the present embodiment, the flexible printed board 157 is simply configured to be drawn out from one place at an end portion thereof. Such a configuration is an optimum configuration in an imaging apparatus (the digital camera 10) including the camera-shake correcting mechanism.

Figure 5:
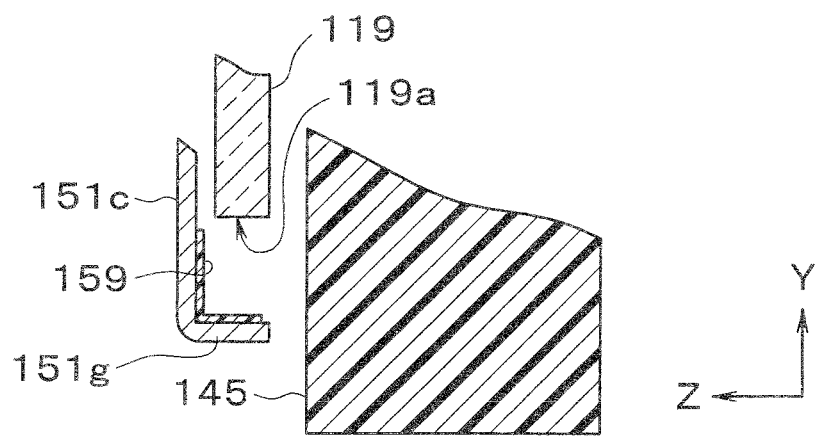
FIG. 5 is a main part enlarged sectional view (a sectional view taken along line [5]-[5] in FIG. 3) showing an arrangement of a dust attracting member in the vibrating device of the imaging apparatus (the digital camera) shown in FIG. 1.

Dust separating from the front surface of the dust-proof filter 119 falls to a bottom surface side (a lower part) of the body unit 100 according to action of an inertial force of the vibration of the dust-proof filter 119 and gravity, as explained below. Therefore, in the digital camera 10 according to the present embodiment, as shown in FIG. 5, a dust attracting member 159 is disposed in a vicinity of a lower edge end 119*a* of the dust-proof filter 119. The dust attracting member 159 is formed of a member including an adhesive member such as an adhesive or an adhesive tape, for example. When the dust-proof filter 119 vibrates, the dust attracting member 159 surely attracts and catches dust separating and falling from the front surface of the dust-proof filter 119 to thereby prevent the dust from adhering to the front surface of the dust-proof filter 119 again. Therefore, as shown in FIG. 5, in the pressing member 151, bent sections 151*g* obtained by bending outer peripheral edge portions of the supporting sections 151*c* in the direction along the optical axis O (the Z direction) and backward are formed in parts of the supporting sections 151*c* on a lower end side of the outer peripheral edge portions and a region between the two fixing sections 151*d* on the lower end side. The dust attracting member 159 is stuck in a form shown in FIG. 5 in a region on inner side surfaces of the bent sections 151*g* and in a vicinity of the lower edge end 119*a* of the dust-proof filter 119.

The camera-shake correcting mechanism in the digital camera 10 according to the present embodiment is briefly explained.

As explained above with reference to FIG. 1, the camera-shake correcting mechanism in the digital camera 10 according to the present embodiment includes the X-axis gyro 160, the Y-axis gyro 161, the anti-vibration control circuit 162, the X-axis actuator 163, the Y-axis actuator 164, the X frame 165, the Y frame 166 (corresponding to the holder 145), the frame 167, the position detection sensor 168, the actuator driving circuit 169 and the like.

The X-axis gyro 160 detects angular velocity of a camera-shake around an X axis of the digital camera 10. The Y-axis gyro 161 detects angular velocity of a camera-shake around a Y axis of the digital camera 10.

The anti-vibration control circuit 162 calculates a camera-shake compensation amount on the basis of an angular velocity signal from the Y-axis gyro 161. When the direction along the optical axis O is set as a Z-axis direction, two axes each orthogonal to a Z axis in an XY plane orthogonal to the optical axis O are set as an X axis direction (a first direction) and a Y-axis direction (a second direction). The anti-vibration control circuit 162 moves, on the basis of data of the calculated camera-shake compensation amount, the CCD 117 by predetermined amounts respectively in the X-axis direction and the Y-axis direction in the XY plane to compensate for an image blur.

The X-axis actuator 163 is a driving source configured to receive a driving signal from the actuator driving circuit 169 and drive the CCD 117 in the X-axis direction. The Y-axis actuator 164 is a driving source configured to receive a driving signal from the actuator driving circuit 169 and drive the CCD 117 in the Y-axis direction. As the X-axis actuator 163 and the Y-axis actuator 164, a combination of an electromagnetic rotation motor, a screw feeding mechanism, and the like, a linear electromagnetic motor including a voice coil motor, a linear piezoelectric motor, or the like is used.

An X frame 165 and a Y frame 166 (the holder 145) mounted with the CCD 117 are configured as moving targets moved with respect to the frame 167.

The position detection sensor 168 is a sensor member configured to detect positions of the X frame 165 and the Y frame 166 (the holder 145).

The anti-vibration control circuit 162 subjects the Y frame 166 mounted with the CCD 117 to movement control for blur correction using position information of the position detection sensor 168 and speed information obtained by differentiating the position information and controls the actuator driving circuit 169 not to drive the X-axis actuator 163 and the Y-axis actuator 164 exceeding a displaceable and movable range.

Figure 4:
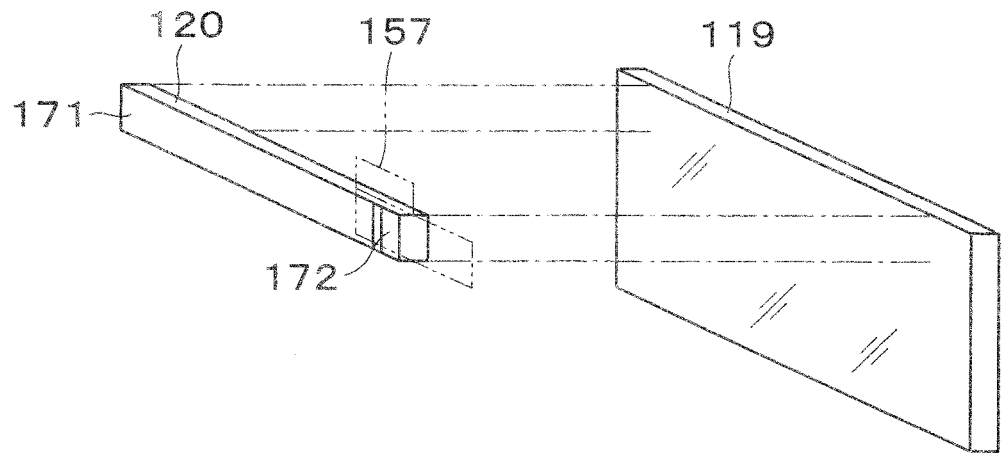
FIG. 4 is a main part enlarged exploded perspective view showing a main configuration section (a transducer) of the vibrating device (a dust removing mechanism) extracted from the imaging apparatus (the digital camera) shown in FIG. 1.
Figure 6:
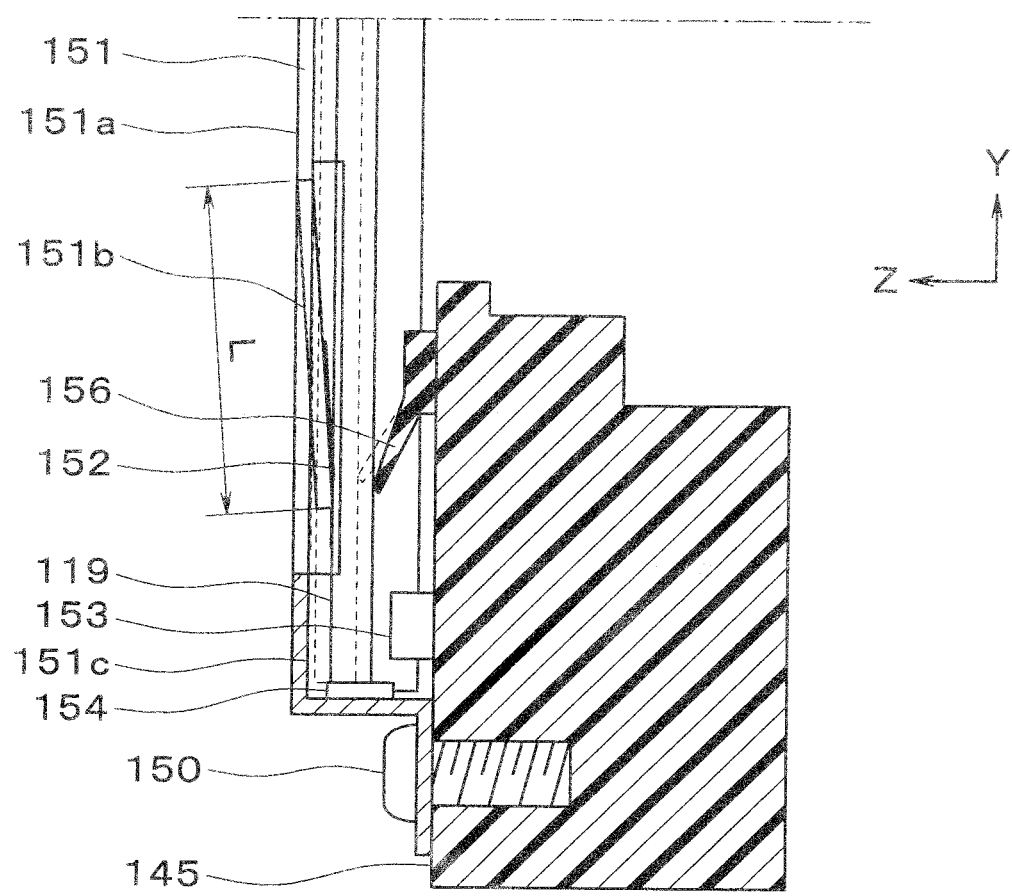
FIG. 6 is a main part enlarged sectional view showing an enlarged main section of a dust-proof member pressing mechanism in the vibrating device of the imaging apparatus (the digital camera) shown in FIG. 1.

The vibrating device (the dust removing mechanism) in the digital camera 10 according to the present embodiment is explained more in detail with reference to FIGS. 4 to 12. FIG. 4 is a main part enlarged exploded perspective view showing a main configuration section (a transducer) of the vibrating device (the dust removing mechanism) extracted from the digital camera according to the present embodiment. FIG. 5 is a main part enlarged sectional view showing an arrangement of the dust attracting member in the vibrating device of the vibrating device of the digital camera according to the present embodiment. FIG. 5 shows a cross section taken along line [5]-[5] in FIG. 3. FIG. 6 is a main part enlarged sectional view showing an enlarged main section of the dust-proof member pressing mechanism in the vibrating device of the digital camera according to the present embodiment. FIG. 6 shows a state in which an external force is applied to the dust-proof filter in the counter-pressing direction and shows an enlarged part of FIG. 2A (a vicinity indicated by an arrow [6] in FIG. 2A).

Figure 8B:
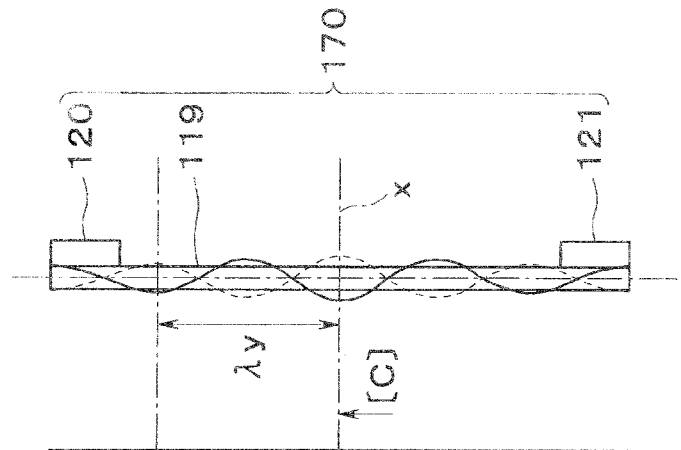
FIG. 8B is a diagram for explaining the concept of generation of vibration of the dust-proof filter in the vibrating device of the imaging apparatus (the digital camera) shown in FIG. 1 and a longitudinal sectional view of the dust-proof filter.
Figure 8A:
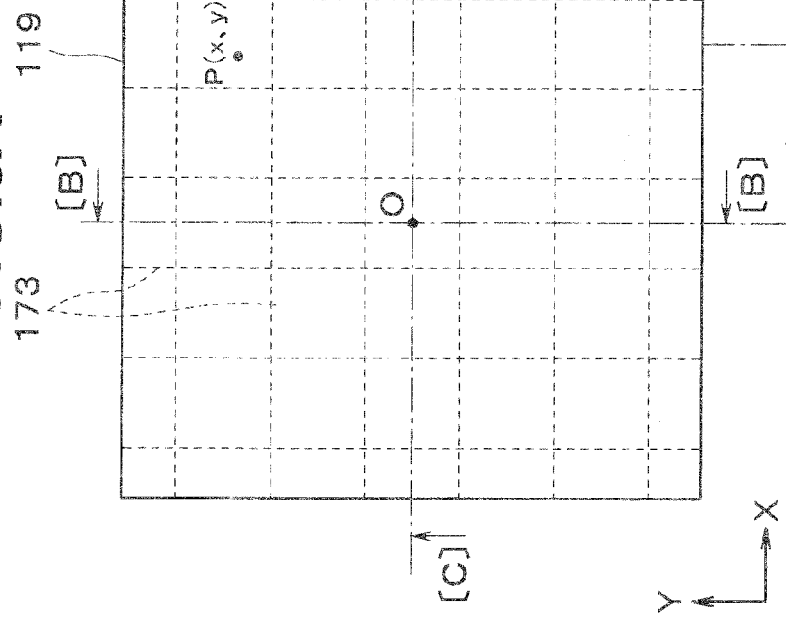
FIG. 8A is a diagram for explaining a concept of generation of vibration of the dust-proof filter in the vibrating device of the imaging apparatus (the digital camera) shown in FIG. 1 and a front view of the dust-proof filter.
Figure 8C:
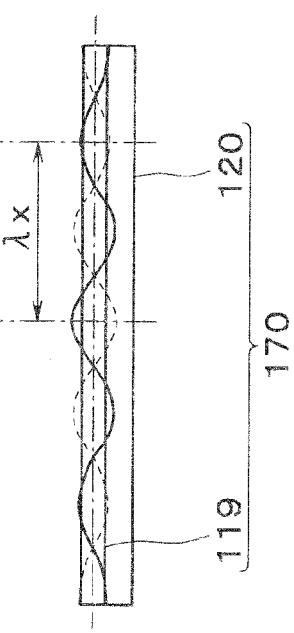
FIG. 8C is a diagram for explaining the concept of generation of vibration of the dust-proof filter in the vibrating device of the imaging apparatus (the digital camera) shown in FIG. 1 and a cross sectional view of the dust-proof filter.
Figure 10:
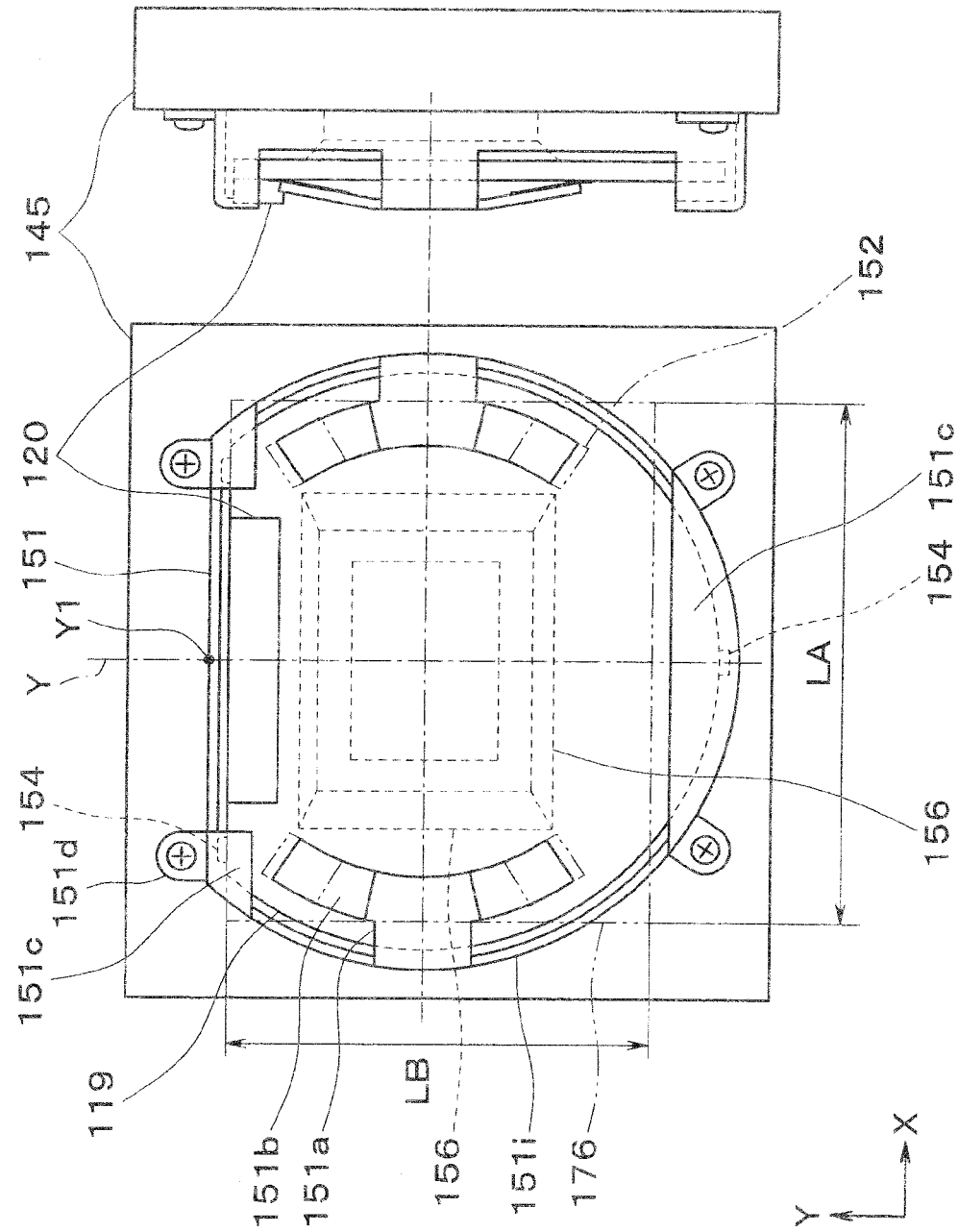
FIG. 10 is a diagram showing a different form of the dust-proof filter in the vibrating device of the imaging apparatus (the digital camera) shown in FIG. 1 and the dust-proof member pressing mechanism of the vibrating device.
Figure 11:
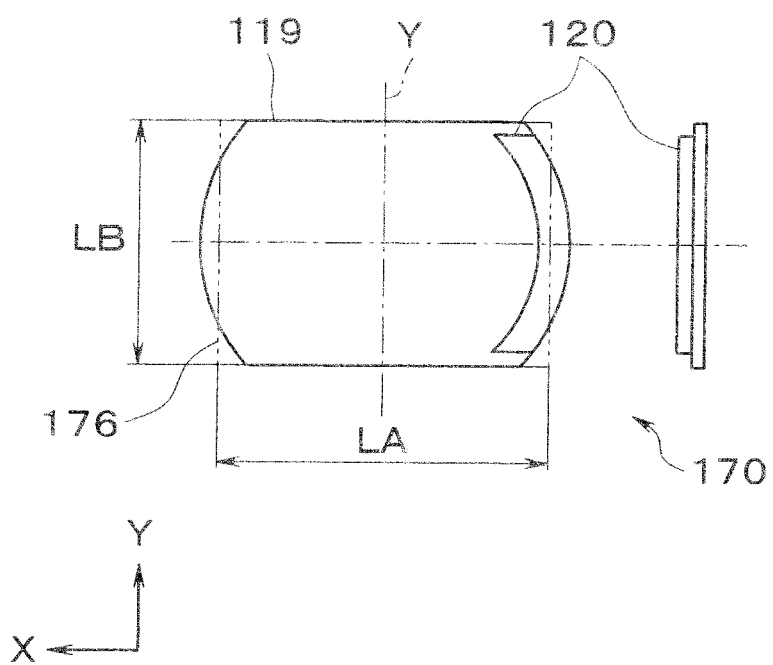
FIG. 11 is a diagram showing another different form of the dust-proof filter in the vibrating device of the imaging apparatus (the digital camera) shown in FIG. 1.
Figure 12:
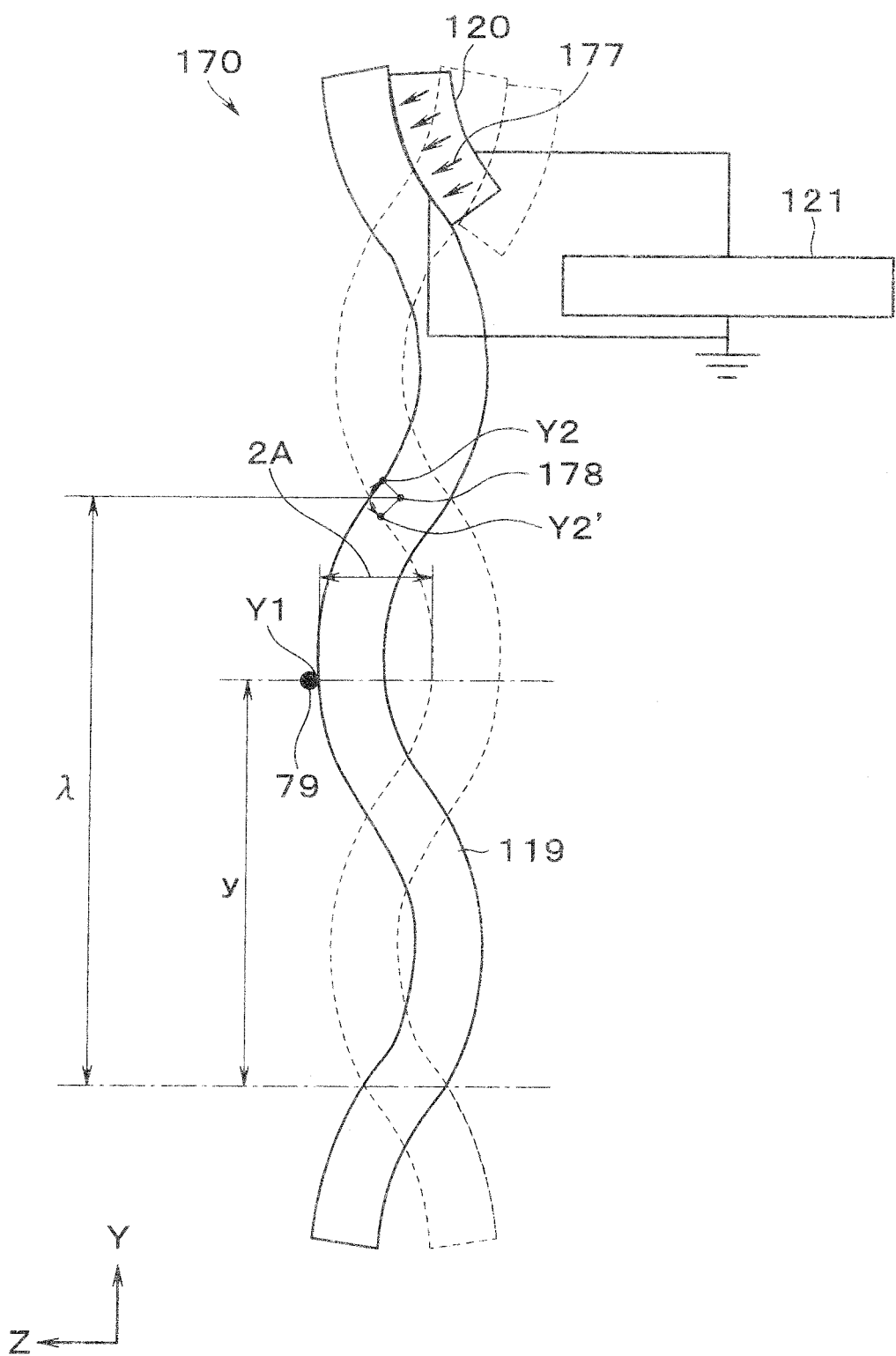
FIG. 12 is a conceptual diagram (a diagram equivalent to the longitudinal sectional view of FIG. 7B) for explaining a standing wave generated in the dust-proof filter in the vibrating device of the imaging apparatus (the digital camera) shown in FIG. 1.

FIGS. 7A, 7B, and 7C are diagrams for explaining a state of vibration generated in the dust-proof filter (a vibration mode 1). FIG. 7A is a front view of the dust-proof filter. FIG. 7B is a longitudinal sectional view taken along line [B]-[B]. FIG. 7C is a cross sectional view taken along line [C]-[C]. FIGS. 8A, 8B, and 8C are diagrams for explaining a concept of generation of vibration of the dust-proof filter in the vibrating device. FIG. 8A is a front view of the dust-proof filter. FIG. 8B is a longitudinal sectional view taken along line [B]-[B]. FIG. 8C is a cross sectional view taken along line [C]-[C]. FIGS. 9A, 9B, and 9C are diagrams for explaining a state of vibration generated in the dust-proof filter in the vibrating device (a vibration mode 3). The vibration shown in FIGS. 9A, 9B, and 9C is different from the vibration shown in FIGS. 8A, 8B, and 8C. FIG. 10 is a diagram showing a different form of the dust-proof filter in the vibrating device and the dust-proof member pressing mechanism of the vibrating device. FIG. 11 is a diagram showing another different form of the dust-proof filter in the vibrating device. FIG. 12 is a conceptual diagram for explaining a standing wave generated in the dust-proof filter in the vibrating device and is equivalent to the longitudinal sectional view of FIG. 7B.

The dust-proof filter 119 is formed in a plate shape polygonal as a whole (in the present embodiment, a square shape) including at least one side symmetrical with respect to a certain axis of symmetry. At least a region of the dust-proof filter 119 having a predetermined spread in a radial direction from a position where maximum vibration amplitude is obtained configures a transparent section. Note that the dust-proof filter 119 may be formed in a D shape formed in a circular shape as a whole and having one side obtained by linearly cutting a part of the circle or may be formed in a shape obtained by forming both sides of a square in an arc shape to have upper and lower two sides. The transparent section of the dust-proof filter 119 is arranged to be opposed to the optical LPF 118 a predetermined space apart from the front surface side of the optical LPF 118 by the attaching means (the holder 145, the pressing member 151, and the like).

In a vicinity of an upper side outer peripheral edge portion of one surface (in the present embodiment, the rear surface side) of the dust-proof filter 119, the piezoelectric element 120, which is the vibration-applying member, for applying vibration to the dust-proof filter 119 is fixedly provided by means such as bonding by an adhesive. A transducer 170 is formed by disposing the piezoelectric element 120 in the dust-proof filter 119 (see FIG. 4). When a predetermined cyclic voltage is applied to the piezoelectric element 120, the transducer 170 resonantly vibrates and generates bending vibration at large amplitude as shown in FIGS. 7A, 7B, and 7C.

As shown in FIG. 4, in the piezoelectric element 120, a signal electrode 171 and a signal electrode 172 provided on a rear surface opposed to the signal electrode 171 and drawn around, through a side surface, to a surface on a side where the signal electrode 171 is present are formed. The flexible printed board 157 is electrically connected to each of the signal electrode 171 and the signal electrode 172. The flexible printed board 157 is connected to the dust-proof filter control circuit 121. According to this configuration, the dust-proof filter control circuit 121 can apply a driving voltage having a predetermined cycle to the signal electrodes 171 and 172 via the flexible printed board 157 and cause the dust-proof filter 119 to generate two-dimensional standing wave bending vibration (the vibration mode 1) shown in FIGS. 7A, 7B, and 7C.

The bending vibration shown in FIGS. 7A, 7B, and 7C indicates standing wave vibration. A mesh area 173 shown in FIG. 7A indicates a node area of vibration (an area with small vibration amplitude). The mesh area 173 is substantially symmetrical to the imaginary line passing through the center of gravity of the dust-proof filter 119.

In FIGS. 7A, 7B, and 7C, reference sign 119a denotes the center of gravity of the dust-proof filter 119. Reference sign 120a denotes a center of gravity of the piezoelectric element 120. Reference numeral 149 denotes a passing area of a focused beam. Reference numeral 173 denotes the node area (the area with small vibration amplitude) (explained above). Reference numeral 174 denotes a ridge line of a mountain of vibration amplitude. Reference sign 175 denotes a center vibration region. Reference sign 175a denotes a center of gravity of the center vibration region. Reference sign 180 denotes supporting areas. An alternate long and two short dashes line denoted by reference numeral 181 indicates a contact section of the seal 156.

When vibration speed is high, if a space of the node area 173 is small as shown in FIG. 7A, large in-plane vibration is generated in the node area 173 and a large inertial force is generated in an in-plane vibration direction in dust present in the node area 173 (see movement of a material point Y2 in FIG. 12 explained below. The material point Y2 vibrates in an arc between Y2 and Y2' around a node). When the surface of the dust-proof filter 119 is tilted in a direction parallel to the gravity such that a force acts on dust along an adhesion surface of the dust, the inertial force and the gravity also act on dust adhering to the node area 173 and the dust can be removed.

A white area in FIG. 7A indicates an area with large vibration amplitude. Dust adhering to the white area is removed by the inertial force applied by the vibration. Dust adhering to the node area 173 of the vibration can be removed as well by apply vibration to the dust in another vibration mode having amplitude in the node area 173.

The vibration mode 1 of bending shown in FIGS. 7A, 7B, and 7C is formed by a combination of bending vibration in the X direction and bending vibration in the Y direction. A situation of a basic state of this combination is shown in FIGS. 8A, 8B, and 8C. As shown in FIGS. 8A, 8B, and 8C, in this example, in the transducer 170, two piezoelectric elements 120 and 121 are arranged symmetrically with respect to a center axis X of the dust-proof filter 119. It is assumed that the transducer 170 is placed on a member with little vibration damping such as sponge and freely vibrated. In this case, vibration in which the node area 173 having a lattice shape shown in FIGS. 8A, 8B, and 8C is generated can be easily obtained (see Japanese Patent Application Laid-Open Publication No. 2007-267189). In that case, standing wave bending vibration having wavelength λx is generated in the X direction and standing wave bending vibration having wavelength λy is generated in the Y direction. FIGS. 8A, 8B, and 8C show a state in which both the standing waves (λx, λy) are combined.

In FIG. 8A, when a point indicated by a sign O is set as an original in coordinates x=0, y=0, vibration Z(x, y) in the Z direction (the direction orthogonal to the XY plane) of an arbitrary point P(x, y) in the figure is represented by the following Equation (1) using amplitude A (which is a fixed value but, actually, changes according to a vibration mode and electric power inputted to a piezoelectric element), orders m, n (positive integers including 0) of peculiar vibration corresponding to the vibration mode, and an arbitrary phase angle γ:

$$Z(x,y) = A \cdot Wmn(x,y) \cdot \cos(\gamma) + A \cdot Wnm(x,y) \cdot \sin(\gamma) \quad (1)$$

where
Wmn(x, y)=sin(nπ·x+π/2)·sin(mπ·y+π/2)
Wnm(x, y)=sin(mπ·x+π/2)·sin(nπ·y+π/2)

For example, when the phase angle γ=0, Equation (1) is transformed as follows:

$$Z(x, y) = A \cdot Wmn(x, y)$$
$$= A \cdot \sin(n \cdot \pi \cdot x/\lambda x + \pi/2) \cdot \sin(m \cdot \pi \cdot y/\lambda y + \pi/2)$$

When λx=λy=λ=1 (x and y are represented with wavelength of bending set as unit length), Equation (1) is transformed as follows:

$$Z(x, y) = A \cdot Wmn(x, y)$$
$$= A \cdot \sin(n \cdot \pi \cdot x + \pi/2) \cdot \sin(m \cdot \pi \cdot y + \pi/2)$$

FIGS. 8A, 8B, and 8C show a vibration mode in the case of m=n (since orders and wavelength of vibrations in the X direction and the Y direction are the same, a shape of the dust-proof filter 119 is a square). Mountains, nodes, and valleys of vibrations appear at equal intervals in the X direction and the Y direction. The node areas 173 of the vibrations appear in a grid shape (a vibration mode in the past). In a vibration mode in the case of m=0 and n=1, parallel mountains, nodes, and valleys are formed in vibrations with respect to a side (a side LB) parallel to the Y direction. In the vibration mode of the grid shape or parallel to the side, vibrations in the X direction and the Y direction simply appear in dependent from each other. It does not occur that the vibrations are combined at intersection of the X direction and the Y direction of the vibration of the grid shape and vibration amplitude increases.

When the shape of the dust-proof filter 119 is slightly changed to a rectangle, even if a piezoelectric element is arranged along one side as in the configuration example of the present embodiment, vibration amplitude is extremely large in a vibration mode (maximum amplitude is at the same level as maximum amplitude of the circular dust-proof filter in the past). At this point, the vibration mode is the vibration mode 1 shown in FIGS. 7A, 7B, and 7C. Although the dust-proof filter 119 is a rectangle, the ridge line 174 of a mountain of vibration amplitude forms a closed curve with respect to an optical axis center. A reflected wave from a side in the X direction and a reflected wave from a side in the Y direction are efficiently combined to form a standing wave.

FIGS. 9A, 9B, and 9C show another vibration mode (a vibration mode 3) generated by changing the excitation frequency of the dust-proof filter 119 shown in FIGS. 7A, 7B, and 7C. The vibration mode is a vibration mode in which the ridge line 174 of a mountain of vibration amplitude surrounding a center of a side is formed.

In FIGS. 7A, 7B, and 7C, the dust-proof filter 119 of the transducer 170 is a sheet glass having a size of 30.5 mm (X direction: LA)×31.5 mm (Y direction: LB)×0.65 mm (thickness). The piezoelectric element 120 is made of ceramics of lead zirconate titanate having a size of 21 mm (X direction)×3 mm (Y direction)×0.8 mm (thickness). The piezoelectric element 120 is bonded and fixed by an epoxy adhesive in a predetermined position on the rear surface side of the dust-proof filter 119, i.e., in a position symmetrical with respect to a Y axis center of the dust-proof filter 119 in the vicinity of the upper side outer peripheral edge portion of the dust-proof filter 119. At this point, a resonant frequency of the vibration mode shown in FIGS. 7A, 7B, and 7C is near 78 kHz. Largest vibration speed and vibration amplitude substantially equivalent to those obtained when a dust-proof filter is formed in a circular shape of a size inscribed by the square dust-proof filter 119 are obtained in a center position of the dust-proof filter 119.

FIG. 10 shows a modification of the transducer 170 and the pressing member 151. In the dust-proof filter 119 in this modification, a part of a disk shape is cut out to form one side D.

That is, the dust-proof filter 119 having one side D symmetrical with respect to an axis of symmetry in the Y direction and has a substantial D shape as a whole. The piezoelectric element 120 is fixedly arranged on the surface of the dust-proof filter 119 in parallel to the one side D and symmetrical with respect to an axis line including a middle point Y1 of the one side D (i.e., an axis of symmetry Y in the Y direction).

When a shape of the dust-proof filter 119 is formed in a shape shown in FIG. 10, symmetry of the shape with respect to a center (which may be considered a center of gravity) of the dust-proof filter 119 increases and the vibration state shown in FIGS. 7A, 7B, and 7C is more easily formed. In addition, naturally, the shape of the dust-proof filter is smaller than the circular shape.

Further, when the piezoelectric element 120 is arranged in parallel to the one side D, asymmetry with respect to vibration generated by forming the cutout can be changed to symmetry by increasing rigidity. A required vibration state is more easily formed. As shown in the figure, as short sides and long sides in FIG. 10, one side extends along the abovementioned one side of the dust-proof filter 119, a side opposed to the one side is one side of an imaginary rectangle 176 (a rectangle indicated by an alternate long and two short dashes line in FIG. 10) parallel to the abovementioned one side and having an area equal to an area of the dust-proof filter 119, and a side orthogonal to the one side is a side of the imaginary rectangle 176 also having an area equal to the area of the dust-proof filter 119.

On the other hand, in the pressing member 151, a main body section 151$i$ is formed in a cylindrical shape to extend along an external shape of the dust-proof filter 119. The arms 151$b$ extend along an outer circumference of the dust-proof filter 119 from end portions of the plurality of arm supporting sections 151$a$ extending to an inner circumferential side of the main body section 151$i$ and presses and support the dust-proof filter 119 via the receiving members 152 at end portions of the arms 151$b$. The plurality of fixing sections 151$d$ are extended to an outer circumferential side of the main body section 151$i$ of the pressing member 151 and fixed to the holder 145 by screws or the like. Further, when the arms 151$b$ are displaced by a predetermined amount by an external force, the arms 151$b$ are supported by the plurality of supporting sections 151$c$ extended to the inner circumferential side of the main body section 151$i$.

Naturally, a spring constant of the supporting sections 151$c$ is larger than a spring constant of the arms 151$b$ of the pressing member 151 formed of the elastic member and the supporting sections 151$c$ have a function of preventing excessive deformation and permanent deformation of the arms 151$b$. The supporting sections 151$c$ have sufficient rigidity against an assumed external force.

One arm 151$b$ has lower rigidity to set a pressing force of the dust-proof filter 119 to a force equal to or smaller than 2 N (Newton). Positioning in the X direction and the Y direction of the dust-proof filter 119 is performed by the plurality of supporting members 154 arranged between the dust-proof filter 119 and the supporting sections 151$c$ of the pressing member 151 and set in the supporting sections 151$c$.

The seal 156 is interposed between the dust-proof filter 119 and the holder 145. Consequently, the seal 156 supports the dust-proof filter 119 from the rear surface side and keeps the space between the dust-proof filter 119 and the holder 145 in a hermetically sealed state at a level enough to prevent dust from entering the space.

FIG. 11 shows another modification of the transducer 170. In the other modification, in the dust-proof filter 119, parallel two sides are formed by forming cutouts symmetrically with respect to a disk shape. That is, the dust-proof filter 119 has two sides symmetrical with respect to the axis of symmetry Y in the Y direction. In this case, in the piezoelectric element 120, an arc-like element is arranged in a portion forming a circumference.

When such a form is adopted, since the piezoelectric element 120 is efficiently arranged, the transducer 170 having a smaller size can be formed. As short side and long sides in FIG. 11, as shown in the figure, one side and a side opposed to the one side are a long side and a short side of an imaginary rectangle 175 extending along two sides of the dust-proof filter 119 and having an area equal to the area of the dust-proof filter 119. Even in this form of the dust-proof filter 119, a pressing member similar to the pressing member 151 of the form shown in FIG. 10 can be applied and the dust-proof member pressing mechanism of the dust-proof filter 119 of the present invention can be realized.

Removal of dust is explained in detail with reference to FIG. 12.

When a predetermined cyclic voltage is applied to the piezoelectric element 120 polarized in a direction indicated by an arrow 177 in FIG. 12, at a certain point t0, the transducer 170 changes to a state indicated by a solid line in FIG. 12.

Vibration z in the Z direction at arbitrary time t of a material point Y1 present in an arbitrary position y on a surface of the transducer 170 is represented by Equation (2) using angular velocity ω of vibration, amplitude A in the Z direction, and Y=2πy/λ (λ: wavelength of bending vibration).

$$z = A \sin(Y) \cdot \cos(\omega t) \quad (2)$$

Equation (2) represents the standing wave vibration shown in FIGS. 7A, 7B, and 7C. That is, Y=sπ when y=s·λ/2 (s is an integer), and sin(Y) is zero. Therefore, the vibration has, at each λ/2, a node 178 where vibration amplitude in the Z direction is zero irrespective of time. The vibration is standing wave vibration. A state indicated by a broken line in FIG. 12 indicates a state in which vibration is in an anti phase with respect to the state at the time t0, i.e., a state at t=kπ/ω (k is an odd number).

Vibration at a point Y1 on the dust-proof filter 119 is a position of a loop 179 of vibration of a bending standing wave. Vibration amplitude is A. A position z(Y1) at the point Y1 in the Z direction is represented as follows:

$$z(Y1) = A \cos(\omega t) \quad (3)$$

When a frequency of the vibration is represented as f, since ω=2πf, vibration speed Vz(Y1) at the point Y1 is represented as follows by differentiating Equation (3) with time:

$$Vz(Y1) = d(z(Y1))/dt \quad (4)$$
$$= -2\pi f \cdot A \sin(\omega t)$$

Vibration acceleration αz(Y1) at the point Y1 is represented as follows by further differentiating Equation (3) with time:

$$\alpha z(Y1) = d(Vz(Y1))/dt \quad (5)$$
$$= -4\pi^2 f^2 \cdot A\cos(\omega t)$$

Dust 79 adhering to the point Y1 receives acceleration of Equation (5). At this point, when mass of the dust 79 is represented as M, an inertial force Fk applied to the dust 79 is represented as follows:

$$Fk = \alpha z(Y1) \cdot M \quad (6)$$
$$= -4\pi^2 f^2 \cdot A\cos(\omega t) \cdot M$$

It is seen from Equation (6) that it is effective to increase the frequency f because the inertial force Fk increases. However, if the vibration amplitude A is small at that point, the inertial force cannot be increased even if the frequency is increased. In general, if a size of the piezoelectric element 120 that generates vibration energy for excitation is fixed, only predetermined vibration energy can be generated. Therefore, if the frequency is increased in a vibration mode of the same form, the vibration amplitude A is inversely proportional to a square of the frequency f. If the resonant frequency is increased to change the vibration mode to a higher-order mode, the vibration amplitude decreases, the vibration speed does not increase, and the vibration acceleration does not increase either. Rather, if the frequency increases, it is difficult to ideally cause resonance, a vibration energy loss increases, and the vibration acceleration decreases.

That is, if vibration is simply generated in the resonance mode, a mode having large amplitude is not realized and the effect of dust removal is markedly deteriorated. To hold the dust-proof filter 119 shown in FIG. 12, nodes of the vibration only have to be supported. However, if loops of the vibration are supported, the generated vibration is hindered and the vibration acceleration is markedly reduced. As a result, dust removal performance is deteriorated. In the present embodiment, the pressing force is set to 2 N or less by forming the cantilever-like arms 151b along the outer peripheral portion of the dust-proof filter 119. Therefore, even if loop portions of the vibration are supported, the vibration is hardly hindered.

Specifically, the rear surface of the dust-proof filter 119 is received by the seal 156 made of, for example, a frame-like rubber material shown in FIGS. 19, 20, and 21 explained below (a second embodiment explained below). A frequency of a voltage applied to the piezoelectric element 120 is changed to generate each of the vibration mode 1 shown in FIGS. 7A, 7B, and 7C, the vibration mode 3 shown in FIGS. 9A, 9B, and 9C, and a vibration mode 2 having a node parallel to one side of the dust-proof filter 119. A position in the outer peripheral portion of the dust-proof filter 119 where the node is not formed is pressed with a predetermined amount of force. Maximum vibration speed V in the center portion of the dust-proof filter 119 at that point is measured. A ratio V/Vmax1 of the maximum vibration speed V and maximum vibration speed Vmax1 in the center portion of the dust-proof filter 119 obtained when a pressing force applied to the dust-proof filter 119 is set to zero (weight of the dust-proof filter 119 is applied) is as shown in FIG. 23.

When the pressing force is set to 2 N or less, in the vibration mode 1 and the vibration mode 3, V/Vmax1 is equal to or higher than 70% and a decrease in vibration speed is equal to or smaller than 30% with respect to vibration speed obtained when the pressing speed is set to zero. A rate of decrease in the vibration speed due to the pressing is equal to or smaller than a rate of decrease in the vibration speed due to pressing of a node of annular vibration of a disk-like dust-proof filter. The node of the vibration does not vibrate in an amplitude direction (the Z direction in FIG. 12) but performs are vibration around the node as shown in FIG. 12. The dust-proof member pressing mechanism of the present invention can reduce the pressing force to the utmost limit, minimize hindrance of the vibration around the node of the vibration, and obtain large vibration speed. Further, if the pressing force is set to about 1 N, it is seen from FIG. 23 that vibration speed substantially the same as vibration speed obtained when the pressing force is zero can be realized. Therefore, it is possible to realize a vibrating device having a maximum dust removal effect.

When mass of the transducer 170 is represented as m and gravitational acceleration is represented as g (the gravitational acceleration is 1G=9.8 m/s$^2$), a minimum setting value Fmin of the pressing force is set to Fmin>g·m in order to prevent the transducer 170 from being displaced when a posture of the vibrating device is only changed. More specifically, Fmin=2·g·m. Since the dust-proof filter 119 having the shape and the material explained above has the mass m equal to or smaller than about 2 g, the pressing force is equal to or larger than about 0.04 N. When variation in a member and assembly is taken into account, it is desirable to set the minimum setting value Fmin of the pressing force to about 0.4 N by multiplying the pressing force 0.04 N with a safety factor of about 10. On the other hand, as the external force F, when a fall or the like of the device is assumed, it is estimated that acceleration of about several hundred G is applied to the device. Specifically, when the acceleration is 500 G, the external force F is 9.8 N. When the pressing force is set to 0.4 N, the external force is 24.5 times as large as the pressing force. The pressing member in the past is greatly displaced and easily plastically deformed. However, the pressing member 151 of the present invention includes the supporting sections 151c and the rigidity of the supporting sections 151c is about 1000 times or more as high as the rigidity of the arms 151b that generates the pressing force (a spring constant is also about 1000 times or more as large as a spring constant of the arms 151b). Therefore, after the arms 151b is deformed by a predetermined amount, the supporting sections 151c receive an external force F'=F−Δf obtained by subtracting a force Δf required for the predetermined amount of deformation of the arms 151b from the external force F. The supporting sections 151c is displaced by a displacement amount Z1. When a displacement amount of the arms 151b at a spring constant k1 of the supporting sections 151c and a predetermined pressing force F1 is represented as Z and a spring constant of the arms 151b is represented as k2, F'=Z1·k1 and F1=Z2·k2 and Z1/Z2=F'/F1·k2/k1. When k1/k2=1000 and if F'=9.8N and F1=0.4N, Z1/Z2=1/41. A displacement amount of the supporting sections 151c is 1/41 of the displacement amount of the arms 151b. The supporting section 151c does not receive large stress. A necessary space of the pressing member 151 is substantially the same as a necessary space of the dust-proof member pressing mechanism in the past. Practically, Z1/Z2 only has to be about 1/10. In this case, the rigidity (the spring constant) of the supporting sections 151c only has to be set to about 250 times (or more) as high as the rigidity (the spring constant) of the arms 151b.

On the other hand, although the dust-proof filter 119 is rectangular, in the vibration mode 1 shown in FIGS. 7A, 7B, and 7C, the ridge line 174 of the mountain of the vibration amplitude forms a closed curve with respect to the optical axis center. In the vibration mode 3 shown in FIGS. 9A, 9B, and 9C, the ridge line 174 of the mountain of the vibration amplitude forms the curve surrounding the center of the side. The reflected wave from the side in the X direction and the reflected wave from the side in the Y direction are efficiently combined to form the standing wave.

The maximum vibration speed in the center portion of the vibration mode 1 shown in FIGS. 7A, 7B, and 7C is the largest among all the vibration mode and is Vmax1. In the vibration mode 3 shown in FIGS. 9A, 9B, and 9C, the maximum vibration speed in the center portion decreases to about vibration speed slightly exceeding 70% of the maximum vibration speed in the vibration mode 1. Further, in the vibration mode 2, the maximum vibration speed in the center portion is about vibration speed equal to or lower than 40% of the maximum vibration speed in the center portion of the vibration mode 1. The vibration speed is the lowest. However, if the pressing force is set to about 1 N, vibration speed same as vibration speed obtained when the pressing force is set to nearly zero is obtained. The dust-proof member pressing mechanism of the present invention shows a sufficient effect.

On the other hand, in the case of the vibration mode 1, a change in the vibration speed is large with respect to the pressing force near the pressing force 2 N. However, when the pressing force is set to about 1 N, vibration speed of about Vmax1 is secured and a change in the vibration speed with respect to fluctuation in the pressing force is eliminated. Therefore, a stable dust-proof member pressing mechanism can be realized. Even if the pressing force is set to about 2 N in the vibration mode 1, in the dust-proof member pressing mechanism of the present invention, the long cantilever-like arms 151b can be formed along the outer periphery of the dust-proof filter 119. It is possible to reduce the spring constant of the arms 151b. A change in the pressing force with respect to the displacement of the arms 151b decreases. Therefore, it is possible to reduce fluctuation in the pressing force with respect to the variation in components and assembly.

A shape dimension of the dust-proof filter 119 substantially contributes to efficient formation of this combined standing wave. When an aspect ratio (short side/long side), which is a ratio of length of a short side to length of a long side of the dust-proof filter 119, is set to be smaller than 1, although only one piezoelectric element 120 is arranged, a region where vibration speed in the Z direction in the center position of the dust-proof filter 119 is the largest is formed compared with a region obtained when the aspect ratio is set to 1. i.e., the dust-proof filter 119 is formed in a square shape. Actually, the aspect ratio (short side/long side) of the dust-proof filter 119 is desirably set to be equal to or larger than 0.9 and smaller than 1.

In the vibration in which the ridge line 174 of the mountain of the vibration amplitude forms the closed curve with respect to the optical axis center and the vibration in which the ridge line 174 forms the curve surrounding the center of the side, vibration speed equivalent to amplitude of concentric circle-like vibration generated when the dust-proof filter 119 has a disk-like shape can be generated. In a vibration mode in which vibration amplitude parallel to a side is simply generated, vibration acceleration up to one tenth of the vibration acceleration in the vibration mode 1 shown in FIGS. 7A, 7B, and 7C can only be obtained.

In the vibration in which the ridge line 174 of the mountain of the vibration amplitude forms the closed curve with respect to the optical axis center and the vibration in which the ridge line 174 forms the curve surrounding the center of the side, vibration speed is the highest in the center of the transducer 170 and is lower on the closed curve or the surrounding curve closer to the periphery. Consequently, there is also an advantage that an ability of dust removal is higher in a center of an image and, if the center of the transducer 170 is aligned with the optical axis O, the dust 79 is not reflected in a place in the center where image quality is high.

Further, naturally, the node area 173, which is the area with small vibration amplitude in the focused ray passing area 149, is caused to resonate in different vibration modes (specifically, the vibration mode 1, the vibration mode 3, etc. shown in FIG. 23) by changing a driving frequency given to the piezoelectric element 120, whereby a position of a node 177 can be changed to remove the dust 79.

The supporting areas 180 present at four corners in FIGS. 7A, 7B, 7C, 9A, 9B, and 9C are areas where almost no vibration amplitude is present. Therefore, if portions of the supporting areas 180 are pressed in the Z direction to support the dust-proof filter 119 via the receiving members 153 with a vibration damping property such as rubber, damping of vibration hardly occurs and surely pressing can be performed. That is, since the receiving members 153 such as rubber allow vibration in an in-plane direction of the dust-proof filter 119, the vibration in the in-plane direction is also hardly damped. It goes without saying that, even when an external force of about 100 G is applied, the receiving members 153 can receive the dust-proof filter 119. In the configuration of the receiving members 153 explained herein, it is easy to form a configuration for receiving an external force of several tens of Newton.

On the other hand, the seal 156 for receiving the dust-proof filter 119 has to be provided as well in an area where vibration amplitude is present. However, in the vibration mode in the present embodiment, since the vibration amplitude is smaller in a mountain of the vibration amplitude in the periphery, the peripheral portion of the dust-proof filter 119 is received in a lip shape, whereby a strong force does not act in a bending vibration amplitude direction. Since original vibration amplitude is small, damping of vibration by the seal 156 can be reduced to be extremely small. In the present embodiment, as shown in FIGS. 5, 8A, 8B, and 8C, a large portion of the seal contact section 181 is in contact with the node area 173, which is the area where vibration amplitude is small. Therefore, vibration damping is smaller. Further, the lip shape of the seal 156 has a spring property in the Z direction. A spring constant of the seal 156 can be reduced. Therefore, fluctuation in a pressing force with respect to displacement in the Z direction can be reduced and a stable pressing force can be secured. Even when an external force is applied, a space between the dust-proof filter 119 and the supporting sections 151c is small, the seal 156 is displaced in the Z direction by the spring property of the lip portion, and sealability of a space between the dust-proof filter 119 and the optical LPF 118 is kept.

The predetermined frequency for vibrating the piezoelectric element 120 depends on a shape dimension, a material, and a supporting state of the dust-proof filter 119 included in the transducer 170. However, usually, temperature affects a modulus of elasticity of the transducer 170 and is one of factors for changing a peculiar number of vibrations of the transducer 170. Therefore, it is desirable to measure the temperature during operation and take into account the change in the peculiar number of vibrations. In this case, a temperature sensor (not shown in the figures) connected to a temperature measuring circuit (not shown in the figures) is provided in the digital camera 10. It is possible to generate efficient vibration with respect to a temperature change by causing the nonvolatile memory 128 to store a correction value of a vibration frequency of the transducer 170 determined in advance from measured temperature of the temperature sensor, reading the measured temperature and the correction value into the Bucom 101, and calculating a driving frequency and setting the driving frequency as a driving frequency of the dust-proof filter control circuit 121.

Figure 13:
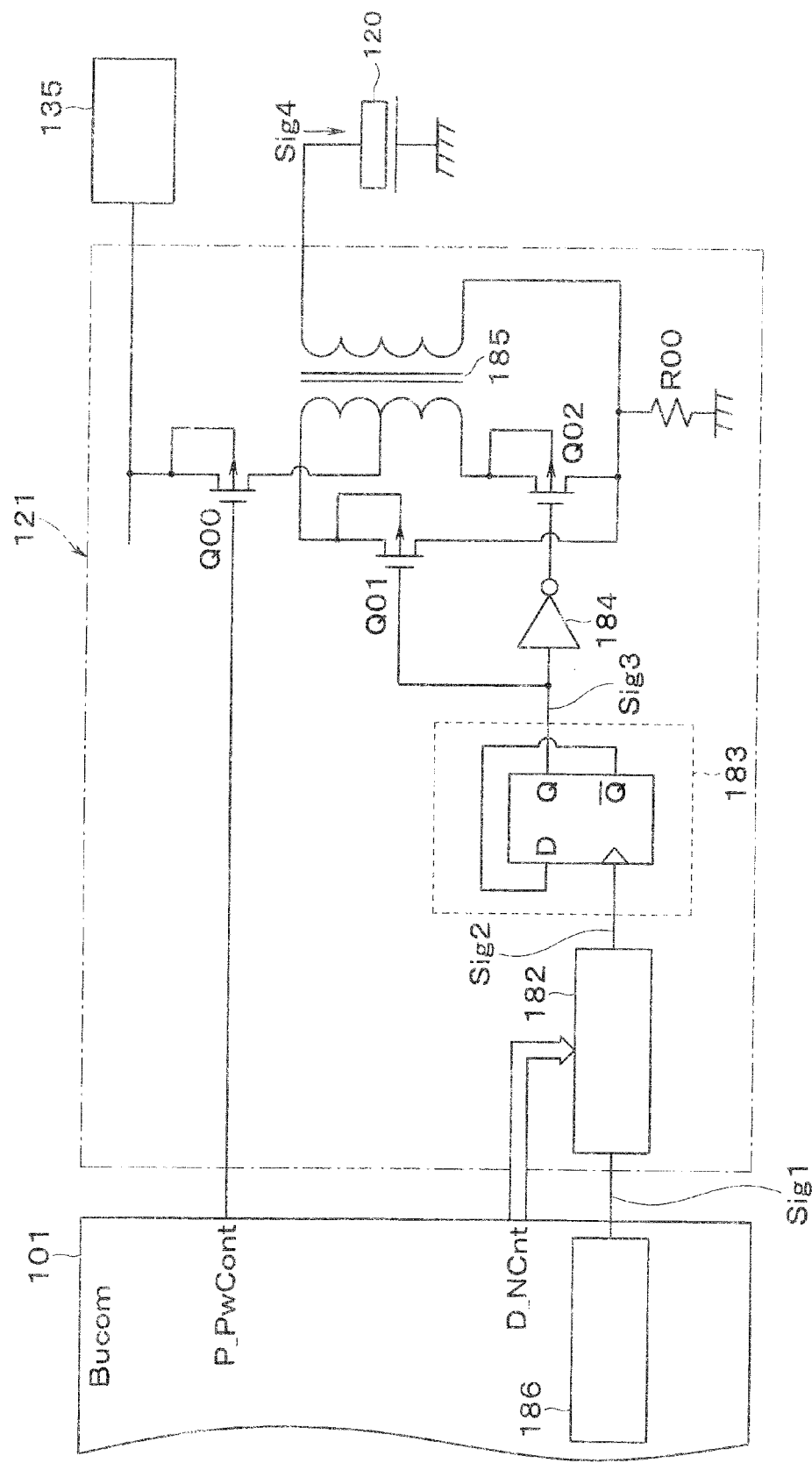
FIG. 13 is a circuit diagram schematically showing a configuration of a dust-proof filter control circuit in a body unit of the imaging apparatus (the digital camera) shown in FIG. 1.
Figure 14:
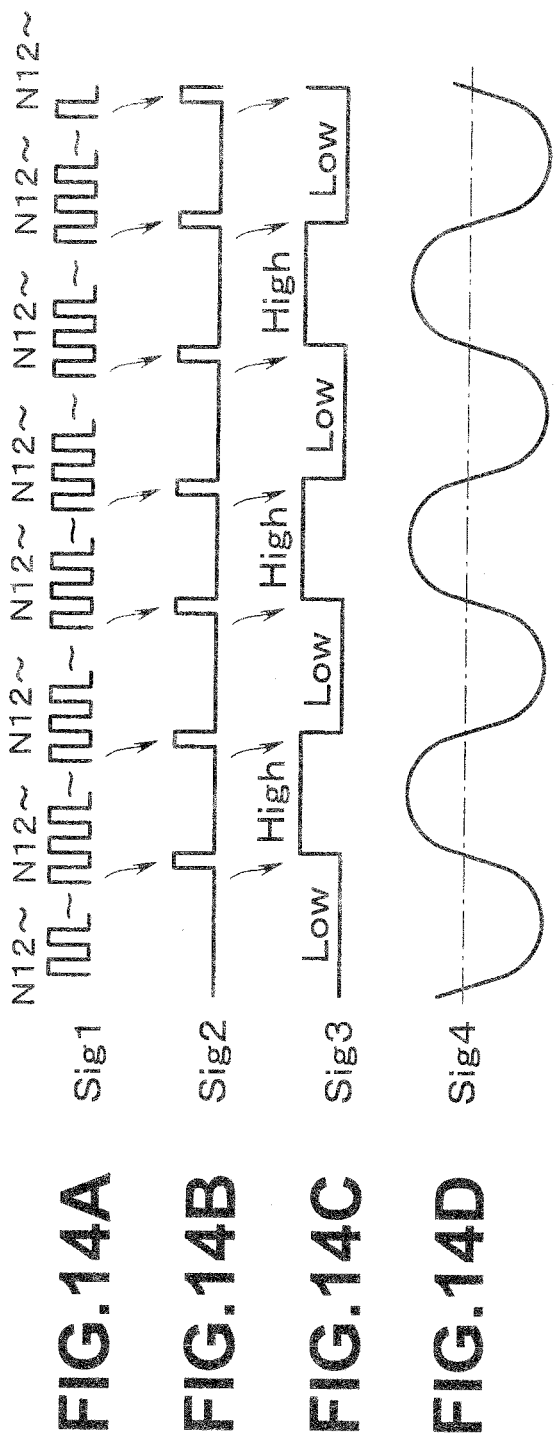
FIG. 14A is a time chart showing a signal form of Sig1 outputted from respective constituent members in the dust-proof filter control circuit shown in FIG. 13.
FIG. 14B is a time chart showing a signal form of Sig2 outputted from the respective constituent members in the dust-proof filter control circuit shown in FIG. 13.
FIG. 14C is a time chart showing a signal form of Sig3 outputted from the respective constituent members in the dust-proof filter control circuit shown in FIG. 13.
FIG. 14D a time chart showing a signal form of Sig4 outputted from the respective constituent members in the dust-proof filter control circuit shown in FIG. 13.

The dust-proof filter control circuit 121 of the digital camera 10 according to the present embodiment is explained below. FIG. 13 is a circuit diagram schematically showing a configuration of the dust-proof filter control circuit 121 in the body unit 100 of the digital camera 10. FIGS. 14A, 14B, 14C, and 14D are time charts showing respective signal forms of Sig1, Sig2, Sig3, and Sig4 outputted from respective constituent members in the dust-proof filter control circuit 121 shown in FIG. 13.

The dust-proof filter control circuit 121 has a circuit configuration shown in FIG. 13. In respective sections of the dust-proof filter control circuit 121, signals (Sig1 to Sig4) having waveforms represented by the time charts of FIGS. 14A, 14B, 14C, and 14D are generated. The dust-proof filter control circuit 121 is controlled as explained below on the basis of the signals.

The dust-proof filter control circuit 121 includes, as shown in FIG. 13, an N-ary counter 182, a half frequency dividing circuit 183, an inverter 184, a plurality of MOS transistors Q00, Q01, and Q02, a transformer 185, and a resistor R00.

According to an ON/OFF switching operation of the MOS transistor Q01 and the MOS transistor Q02 connected to a primary side of the transformer 185, a signal (Sig4) having a predetermined cycle is generated on a secondary side of the transformer 185. The piezoelectric element 120 is driven on the basis of the signal having the predetermined cycle to cause the transducer 170, to which the dust-proof filter 119 is firmly fixed, to generate a resonant standing wave.

The Bucom 101 controls the dust-proof filter control circuit 121 as explained below via two IO ports P_PwCont and D_NCnt provided as control ports and a clock generator 186 present on an inside of the Bucom 101.

The clock generator 186 outputs a pulse signal (a basic clock signal) to the N-ary counter 182 at a frequency sufficiently earlier than a signal frequency applied to the piezoelectric element 120. This outputted signal is the signal Sig1 having the waveform represented by the time chart of FIG. 14A. The basic clock signal is inputted to the N-ary counter 182.

The N-ary counter 182 counts the pulse signal and outputs a count end pulse signal every time the pulse signal reaches a predetermined value "N". That is, the basic clock signal is frequency-divided into 1/N. This outputted signal is the signal Sig2 having the waveform represented by the time chart of FIG. 14B.

In the frequency-divided pulse signal, a duty ratio of High and Low is not 1:1. Therefore, the duty ratio is converted into 1:1 through the half frequency dividing circuit 183. This converted pulse signal corresponds to the signal Sig3 having the waveform represented by the time chart of FIG. 14C.

In a High state of the converted pulse signal, the MOS transistor Q01 to which the signal is inputted is turned on. On the other hand, the pulse signal is applied to the MOS transistor Q02 through the inverter 184. Therefore, in a Low state of the pulse signal, the MOS transistor Q02 to which the signal is inputted is turned on. When the MOS transistor Q01 and the MOS transistor Q02 connected to the primary side of the transformer 185 are alternately turned on, a signal having a cycle of the signal Sig4 shown in FIG. 14D is generated on the secondary side.

A winding ratio of the transformer 185 depends on an output voltage of a unit of the power supply circuit 135 and a voltage necessary for driving the piezoelectric element 120. Note that a resistor R00 is provided to restrict an excessively large current from flowing to the transformer 185.

When the piezoelectric element 120 is driven, the MOS transistor Q00 has to be in the ON state and a voltage has to be applied from the power supply circuit 135 to a center tap of the transformer 185. In this case, ON/OFF control for the MOS transistor Q00 is performed via the IO port P_PwCont of the Bucom 101. The setting value "N" of the N-ary counter 182 can be set from the IO port D_NCnt of the Bucom 101. Therefore, the Bucom 101 can arbitrarily change the driving frequency of the piezoelectric element 120 by appropriately controlling the setting value "N".

At this point, a frequency can be calculated by Equation (7) below.

$$fdrv=fpls/2N \quad (7)$$

where, N is a setting value in the N-ary counter 182, fpls is a frequency of an output pulse of the clock generator 186, and fdrv is a frequency of a signal applied to the piezoelectric element 120.

The calculation based on Equation (7) is performed by a CPU (control means) of the Bucom 101.

Figure 15:
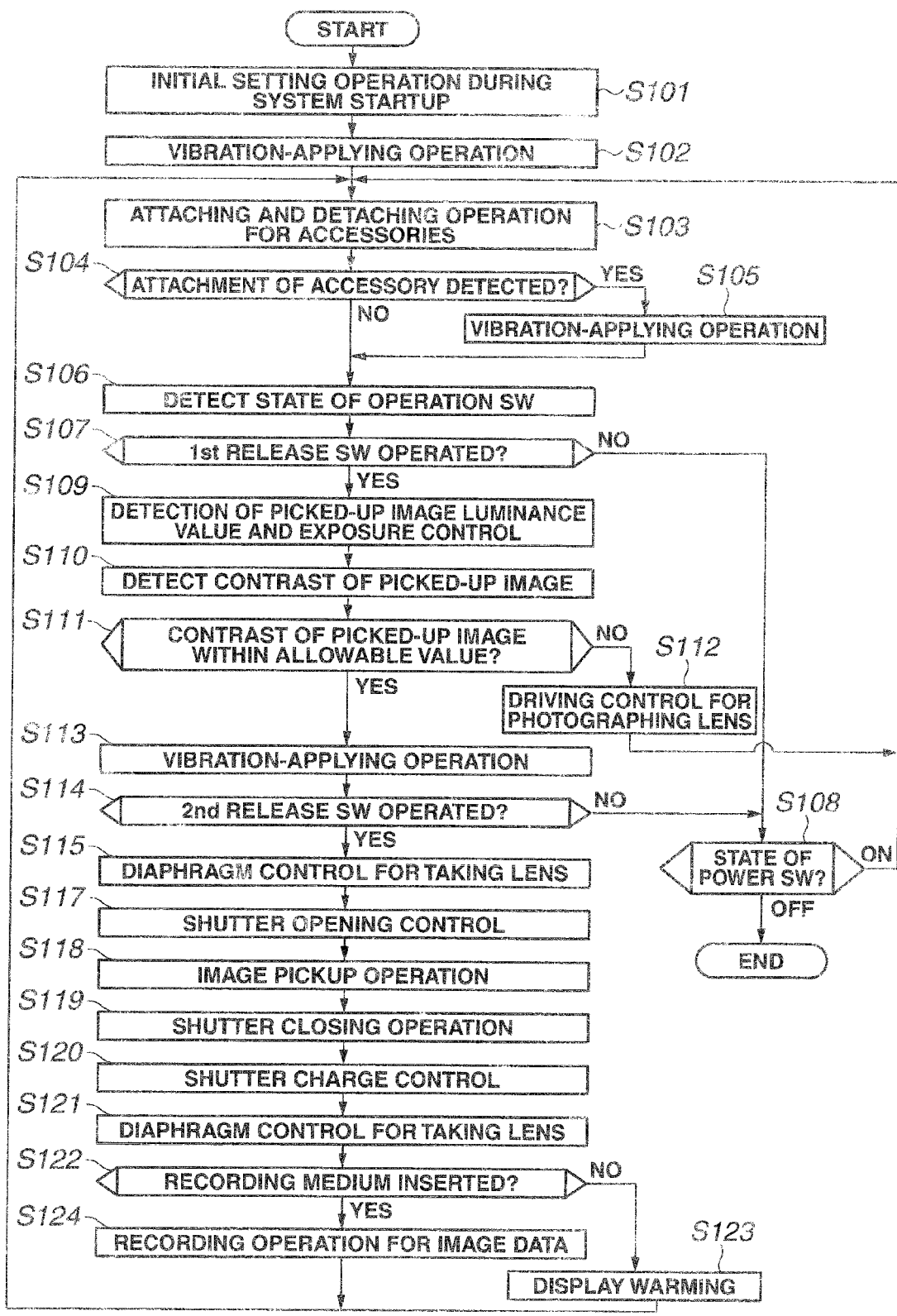
FIG. 15 is a flowchart showing operation control for the imaging apparatus (the digital camera) shown in FIG. 1 and illustrating a procedure of a camera sequence (a main routine) performed by a Bucom.

Control performed by the Bucom 101 is explained below with reference to FIGS. 15 and 16. FIG. 15 is a flowchart for explaining operation control for the digital camera 10 according to the present embodiment. A procedure of a camera sequence (a main routine) performed by the Bucom 101 is illustrated.

A control program related to the flowchart shown in FIG. 15, which can be operated by the Bucom 101, starts the operation when a power SW (not shown in the figures) of the body unit 100 of the digital camera 10 is turned on.

First, the Bucom 101 executes processing for staring up the digital camera 10 (step S101). That is, the Bucom 101 controls the power supply circuit 135 to supply electric power to the respective circuit units included in the digital camera 10. The Bucom 101 performs initial setting of the respective circuits.

Subsequently, the Bucom 101 calls a subroutine "vibration-applying operation" explained below to vibrate the dust-proof filter 119 (step S102).

Subsequent steps S103 to S124 are a group of steps that are periodically executed. That is, first, the Bucom 101 detects attachment and detachment of an accessory to and from the digital camera 10 (step S103). In this step, the Bucom 101 detects that the lens unit 200, which is one of accessories, is attached to the body unit 100. An operation for detecting the attachment and detachment is an operation for checking an attachment and detachment state of the lens unit 200 by performing communication with the Lucom 201.

If it is detected that a predetermined accessory is attached to the body unit 100 (step S104), the Bucom 101 calls the subroutine "vibration-applying operation" to vibrate the dust-proof filter 119 (step S105).

In a period when an accessory, in particular, the lens unit 200 is not attached to the body unit 100, which is a camera main body, it is highly likely that dust adheres to in particular, respective lenses, the dust-proof filter 119, and the like. Therefore, it is effective to execute an operation for whisking off the dust at timing when the attachment of the lens unit 200 is detected as explained above. Further, since it is highly likely that outdoor air circulates into the body unit 100 and dust enters and adheres to the body unit 100 during lens replacement, it is significant to remove the dust during the lens replacement. The Bucom 101 considers that photographing is about to be performed and shifts to step S106.

On the other hand, if it is detected in step S104 that the lens unit 200 is detached from the body unit 100, the Bucom 101 directly shifts to the next step S106.

In step S106, the Bucom 101 detects a state of a predetermined operation switch included in the digital camera 10.

After step S106, usually, the Bucom 101 displays a picked-up image on the liquid crystal monitor 123 and performs so-called through-image display, which is a function of a finder. However, this operation is omitted in the flowchart. Naturally, at this point, the shutter 108 is fully opened, an image is picked up, and exposure control explained below is performed on the basis of the picked-up image.

The Bucom 101 determines, according to an ON/OFF state of a 1st release SW (not shown in the figures) included in release SWs, whether the 1st release SW is operated (step S107). The Bucom 101 reads out the state. If the 1st release SW is not turned on for a predetermined time or more, the Bucom 101 discriminates a state of a power SW (step S108). If the power SW is turned on, the Bucom 101 returns to step S103. If the power SW is turned off, the Bucom 101 performs end processing (sleep, etc.).

On the other hand, if it is determined in step S107 that the release SW is turned on, the Bucom 101 acquires luminance information of an object from a picked-up image received from the image processing controller 126, calculates an exposure time (a Tv value) of the image pickup unit 116 and a diaphragm setting value (an Av value) of the lens unit 200 from the information, and performs exposure control to obtain a proper exposure amount (step S109).

Thereafter, the Bucom 101 detects contrast of the picked-up image (step S110). The Bucom 101 determines whether the detected contrast is within an allowed range (step S111). If the detected contrast is not within the allowed range, the Bucom 101 performs driving control for the taking lens 202 (step S112) and returns to step S103.

On the other hand, if the contrast is within the allowed range, the Bucom 101 calls the subroutine "vibration-applying operation" to start vibration of the dust-proof filter 119 (step S113).

Further, the Bucom 101 determines whether a 2nd release SW (not shown in the figures) included in the release SWs is turned on (step S114). If the 2nd release SW is on, the Bucom 101 shifts to the following step S115 and starts a predetermined image pickup operation (explained in detail below). However, if the 2nd release SW is off, the Bucom 101 shifts to step S108.

During the image pickup operation, as usual, the Bucom 101 controls an electronic image pickup operation for time corresponding to seconds (exposure seconds) set in advance for exposure.

As the image pickup operation, in steps S115 to S121, image pickup of an object is performed in predetermined order. First, the Bucom 101 transmits an Av value to the Lucom 201 and instructs the Lucom 201 to drive the diaphragm 203 (step S115). After closing the front curtain of the shutter 108, the Bucom 101 starts traveling of the front curtain of the shutter 108 and controls the front curtain to open (step S117). The Bucom 101 instructs the image processing controller 126 to execute the "image pickup operation" (step S118). When exposure to the CCD 117 (image pickup) for time indicated by the Tv value ends, the Bucom 101 starts traveling of the rear curtain and controls the rear curtain to close (step S119). When the exposure ends, the Bucom 101 performs a charge operation for the shutter 108 (step S120). In a state in which the shutter 108 is charged, the shutter 108 is set in a full open state.

Thereafter, the Bucom 101 instructs the Lucom 201 to control the diaphragm 203 to move to a predetermined position where proper exposure is obtained in the through-image display (step S121) and ends the series of image pickup operation.

Subsequently, the Bucom 101 detects whether the recording medium 127 is inserted in the body unit 100 (step S122). If the recording medium 127 is not inserted in the body unit 100, the Bucom 101 displays a warning (step S123). The Bucom 101 shifts to step S103 again and repeats the same series of processing.

On the other hand, if the recording medium 127 is inserted into the body unit 100, the Bucom 101 instructs the image processing controller 126 to record picked-up image data in the recording medium 127 (step S124). When a recording operation for the image data ends, the Bucom 101 shifts to step S103 again and repeats the same series of processing. An operation of still image photographing is explained above. Since an operation of moving image photographing is the same operation, the operation of moving image photographing is not explained here.

Concerning generation of a detailed vibration form, a control procedure for the "vibration-applying operation" subroutine called in the three steps (S102, S105, and S113) is explained below on the basis of FIG. 16. The "vibration form" is a form of vibration caused by the piezoelectric element 120, which is the vibration-applying member.

Figure 16:
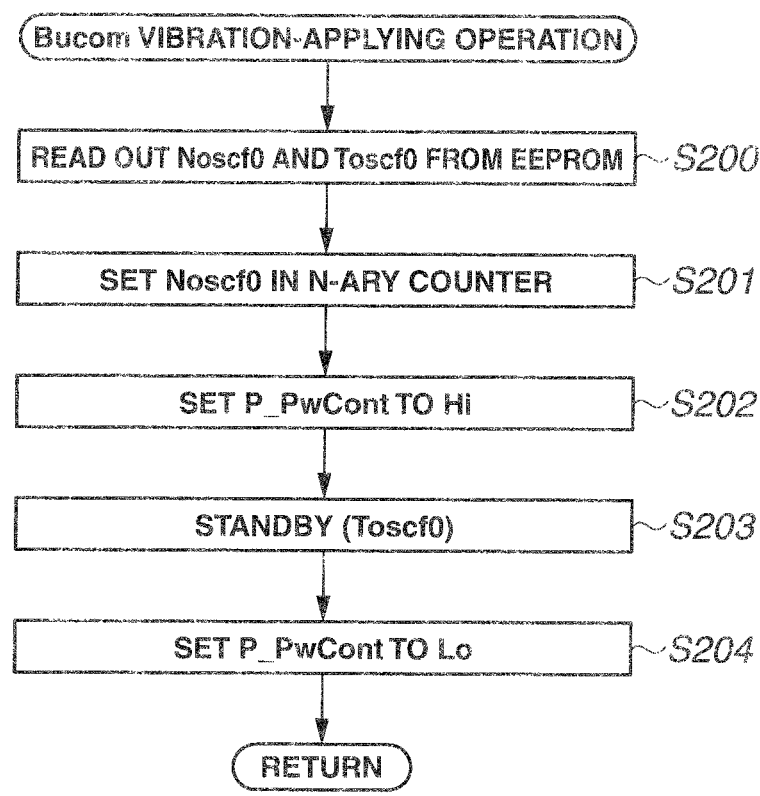
FIG. 16 is a flowchart representing an operation procedure of a subroutine "vibration-applying operation" in the camera sequence shown in FIG. 15.
Figure 17:
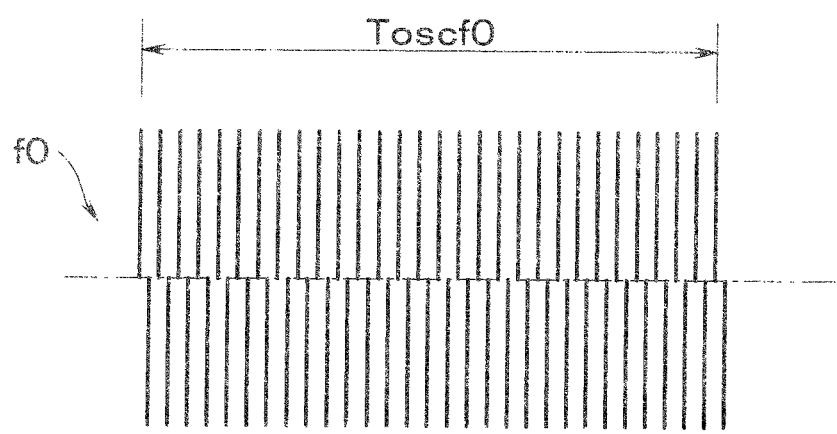
FIG. 17 a graph representing a waveform of a resonant frequency continuously supplied to a vibration-applying member in the "vibration-applying operation" subroutine shown in FIG. 16.

FIG. 16 is a flowchart for explaining an operation procedure of the subroutine "vibration-applying operation". A graph representing a waveform of a resonant frequency continuously supplied to the vibration-applying member in the vibration-applying operation is shown in FIG. 17.

The subroutine "vibration-applying operation" shown in FIG. 16 is a routine for a vibration-applying operation only for dust removal for the dust-proof filter 119. Therefore, a vibration frequency f0 is set to a predetermined frequency near a resonant frequency of the dust-proof filter 119. For example, in the case of the vibration mode shown in FIG. 7, the vibration frequency f0 is 78 kHz.

First, the Bucom 101 reads out, from data stored in a predetermined region of the nonvolatile memory 128, data concerning a driving time (Toscf0) and a driving frequency (a resonant frequency: Noscf0) for vibrating the dust-proof filter 119 (step S200).

Subsequently, the Bucom 101 outputs the driving frequency Noscf0 to the N-ary counter 182 of the dust-proof filter control circuit 121 from the IO port D_NCnt of the Bucom 101 (step S201).

In the following steps S202 to S204, a dust removing operation is performed as explained below. When the Bucom 101 sets a control flag P_PwCont to "Hi" for dust removal (step S202), the piezoelectric element 120 excites the dust-proof filter 119 at a predetermined driving frequency (Noscf0) to whisk off the dust 79 adhering to the surface of the dust-proof filter 119. The dust 79 adhering to the surface of the dust-proof filter 119 is swept off by the dust removing operation.

The Bucom 101 stays on standby for a predetermined driving time (Toscf0) in a state in which the dust-proof filter 119 is vibrated (step S203). After the predetermined driving time (Toscf0) elapses, the Bucom 101 sets the control flag P_Pwcont to Low to stop the dust removing operation (step S204). The Bucom 101 returns to the next step of the called step.

The vibration frequency f0 (the resonant frequency (Noscf0)) and the driving time (Toscf0) applied in the subroutine show a waveform represented by a graph in FIG. 17. That is, the waveform is a continuous waveform in which fixed vibration (f0=78 kHz) continues for time (Toscf0) sufficient for the dust removal. That is, a driving frequency supplied to the vibration-applying member is adjusted and controlled such that this vibration form is generated.

Figure 18:
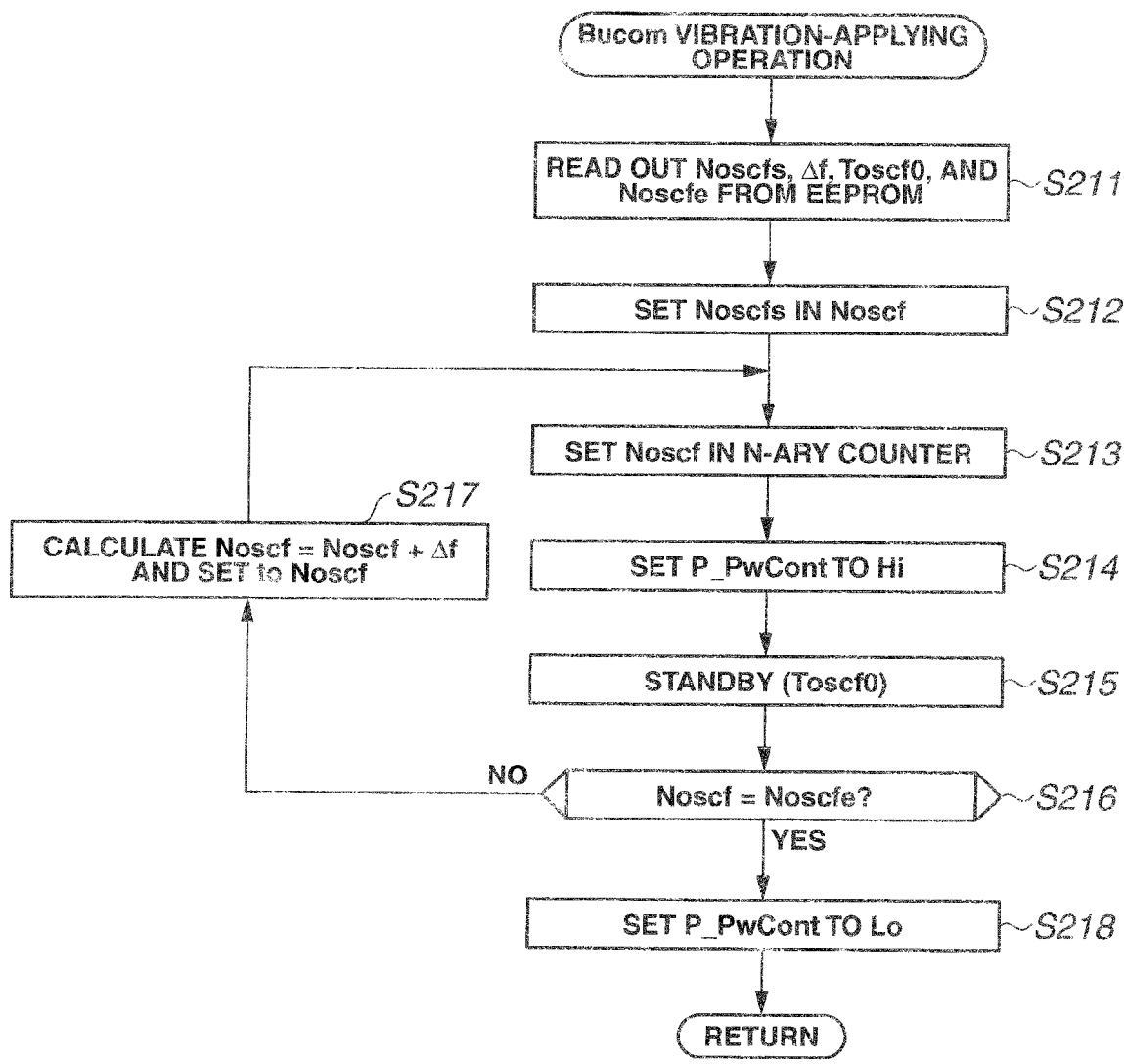
FIG. 18 is a flowchart showing an operation of a modification of the first embodiment of the present invention and representing a different operation procedure of the subroutine "vibration-applying operation" called in the camera sequence (the main routine) performed by the Bucom in the digital camera.

FIG. 18 shows an operation of a modification of the first embodiment of the present invention. FIG. 18 is a flowchart for explaining a different operation procedure of the subroutine "vibration-applying operation" called in the camera sequence (the main routine) performed by the Bucom in the digital camera.

In the flowchart, a part of the operation of the subroutine "vibration-applying operation" shown in FIG. 16 in the first embodiment is changed. An operation of the dust-proof filter 119 is different from the operation in the first embodiment (FIG. 16).

That is, in the first embodiment, the driving frequency of the dust-proof filter 119 is set to the fixed value f0 such that a standing wave is generated. However, in this modification, the driving frequency is sequentially changed and applied to generate vibration with large vibration amplitude including a resonant frequency even if the driving frequency is not strictly controlled.

When the shape dimension and the material of the dust-proof filter 119 change because of manufacturing variation, for the resonant frequency to greatly change, it is necessary to accurately set a resonant frequency for each product and drive the piezoelectric element 120 (vibration speed further decreases if the dust-proof filter 119 is driven at a frequency different from the resonant frequency). If a frequency control method in this modification is applied, driving at the resonant frequency is possible with an extremely simple control circuit. Proper control can be performed even if fluctuation occurs in the resonant frequency because of the manufacturing variation.

A frequency control method according to this modification is explained with reference to FIG. 18.

First, the Bucom 101 reads out, from the data stored in the predetermined region of the nonvolatile memory 128, data concerning a driving time (Toscf0) for vibrating the dust-proof filter 119, a driving start frequency (Noscfs), a frequency transition amount ($\Delta f$), and a driving end frequency (Noscfe) for vibrating the dust-proof filter 119 (step S211).

Subsequently, the Bucom 101 sets the driving start frequency (Noscfs) in a driving frequency (Noscf) (step S212). The Bucom 101 outputs the driving frequency (Noscf) to the N-ary counter 182 of the dust-proof filter control circuit 121 from the IO port D_NCnt of the Bucom 101 (step S213).

In the following step S214 and subsequent steps, a dust removing operation is performed as explained below. That is, the Bucom 101 starts and executes the dust removing operation.

First, when the Bucom 101 sets the control flag P_PwCont to "Hi" for dust removal (step S214), the piezoelectric element 120 excites the dust-proof filter 119 at a predetermined driving frequency (Noscf) and causes the dust-proof filter 119 to generate standing wave vibration with small vibration amplification. The dust 79 (see FIG. 12) adhering to the surface of the dust-proof filter 119 cannot be removed if the vibration amplitude is small. This vibration is continued for the driving time (Toscf0) (step S215).

Subsequently, the Bucom 101 compares the driving frequency (Noscf) and the driving end frequency (Noscfe) and determines whether the driving frequency (Noscf) is the driving end frequency (Noscfe) (step S216). If the driving frequency (Noscf) does not coincide with the driving end frequency (Noscfe) (NO in step S216), the Bucom 101 adds frequency transition amount ($\Delta f$) to the driving frequency (Noscf), sets the driving frequency (Noscf) added with the frequency transition amount ($\Delta f$) to the driving frequency (Noscf) again (step S217), and repeats the operations from the steps S213 to step S215.

On the other hand, if the driving frequency (Noscf) coincides with the driving end frequency (Noscfe) (YES in step S216), the Bucom 101 sets P_Pwcont to Low (step S218), ends the vibration-applying operation for the piezoelectric element 120, and ends the series of "vibration-applying operation".

When the frequency is changed as explained above, amplitude of standing wave vibration increases. Therefore, if the driving start frequency (Noscfs), the frequency transition amount ($\Delta f$), and the driving end frequency (Noscfe) are set to pass a resonant frequency of the standing wave, control can be performed such that, first, standing wave vibration with small vibration amplitude is generated in the dust-proof filter 119, the amplitude of the standing wave vibration gradually increases, and, after the standing wave vibration changes to resonant vibration, the standing wave vibration amplitude decreases. The dust 79 can be removed if vibration amplitude (vibration speed) is equal to or larger than predetermined vibration amplitude (vibration speed). Therefore, it is possible to remove the dust 79 over a certain predetermined frequency range. Since vibration amplitude during resonance is large, naturally, a frequency range is wider.

If a frequency between the driving start frequency (Noscfs) and the driving end frequency (Noscfe) is secured wide to some extent, it is possible to absorb a change in the resonant frequency due to temperature and manufacturing variation of the transducer 170. It is possible to surely whisk off the dust 79 adhering to the dust-proof filter 119 with an extremely simple circuit configuration. Further, when there are a plurality of operation modes, resonant frequencies of which are close to one another, it is possible to reduce a control time and simplify control by setting a driving frequency range including the plurality of vibration modes.

As explained above, according to the first embodiment, the pressing member 151 that presses the plate-like dust-proof filter 119 includes the arms 151b, which are pressing sections, having a low pressing force and low rigidity, i.e., elasticity for generating a pressing force enough for reducing a loss of vibration and the supporting sections 151c having high rigidity compared with the arms 151b. With this configuration, when the dust-proof filter 119 is pressed and supported by the pressing member 151, in the case of a normal low load state, it is possible to reduce a loss of vibration generated in the dust-proof filter 119 to be extremely small. When an external force is applied and a strong load is applied from the dust-proof filter 119 to the pressing member 151, the dust-proof filter 119 is supported in the supporting sections 151c with high rigidity provided in the pressing member 151 and the external force is received. Therefore, it is possible to configure a small dust removing mechanism that always has a high dust removing ability and is robust against the external force.

The rigidity of the supporting sections 151c is set to be at least about 250 times as high as the rigidity of the elastic arms 151b. Therefore, even if power of the elastic arms 151b is small and a portion near the supporting sections 151c is a portion of a vibration loop, it is possible to press the dust-proof filter 119.

Since the dust-proof filter 119 is pressed by the elastic arms 151b, it is possible to provide a vibrating device including a small dust removing mechanism having a simple configuration and high assemblability.

Second Embodiment

A vibrating device according to a second embodiment of the present invention is explained below with reference to FIGS. 19 to 22.

A configuration of the vibrating device according to the present embodiment is basically substantially the same as the vibrating device according to the first embodiment. In the second embodiment, a configuration of a dust-proof member pressing mechanism of the dust-proof filter 119 is different. Therefore, in the following explanation, only components different from the components in the first embodiment are explained in detail. Components same as the components in the first embodiment are denoted by the same reference numerals and signs and explanation of the components is omitted.

Figure 19:
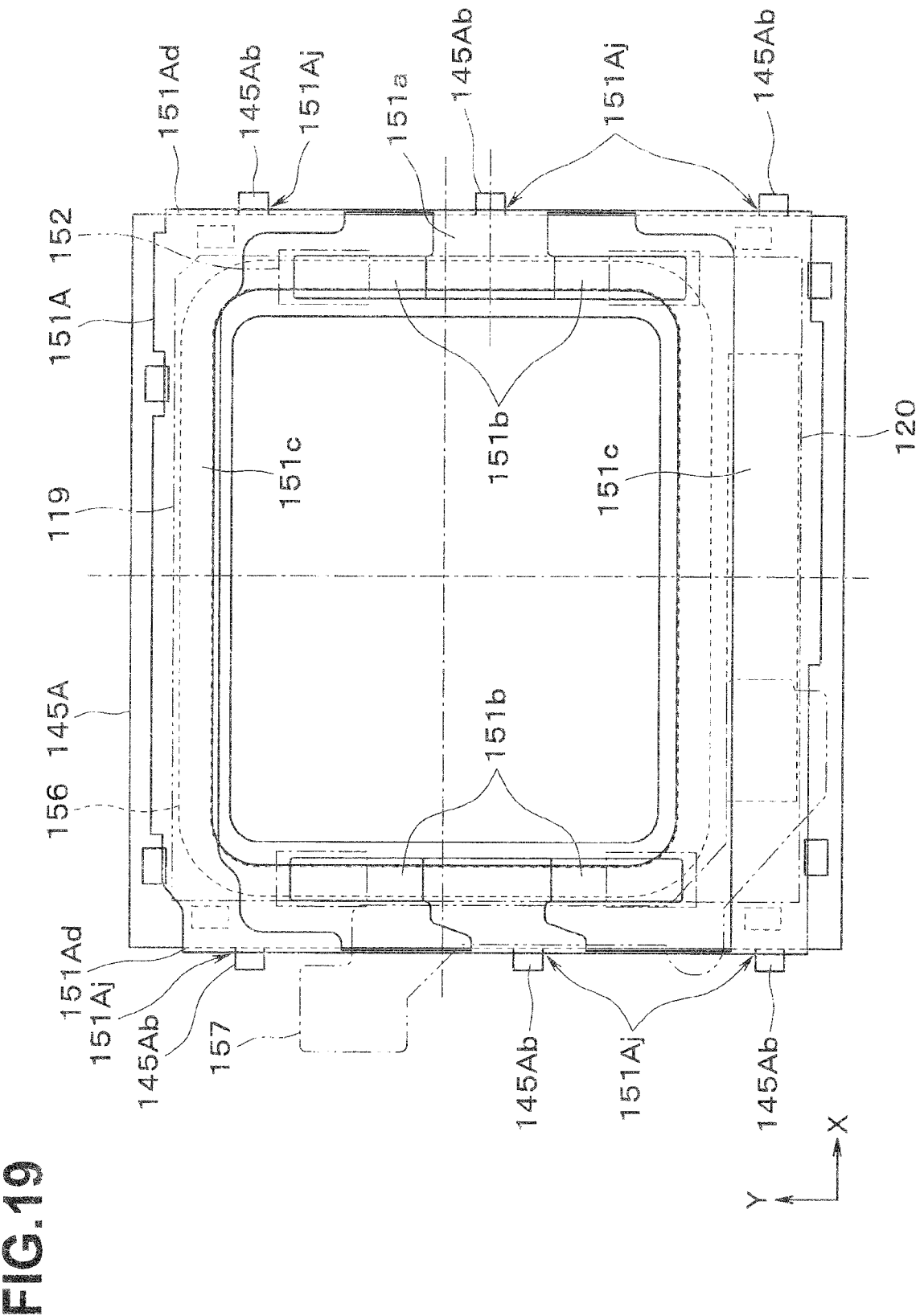
FIG. 19 shows a main configuration of a vibrating device according to a second embodiment of the present invention and is a front view of the vibrating device.
Figure 20:
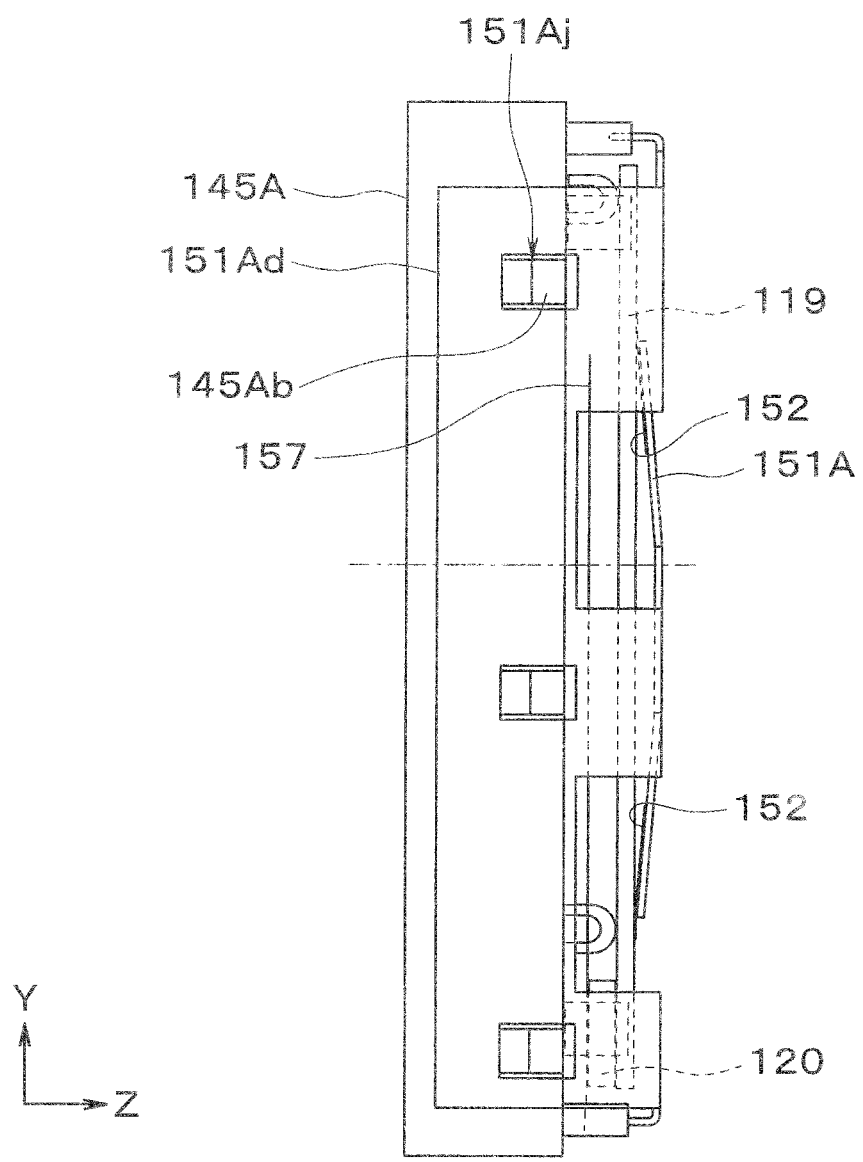
FIG. 20 is a left side view of the vibrating device shown in FIG. 19.
Figure 21:
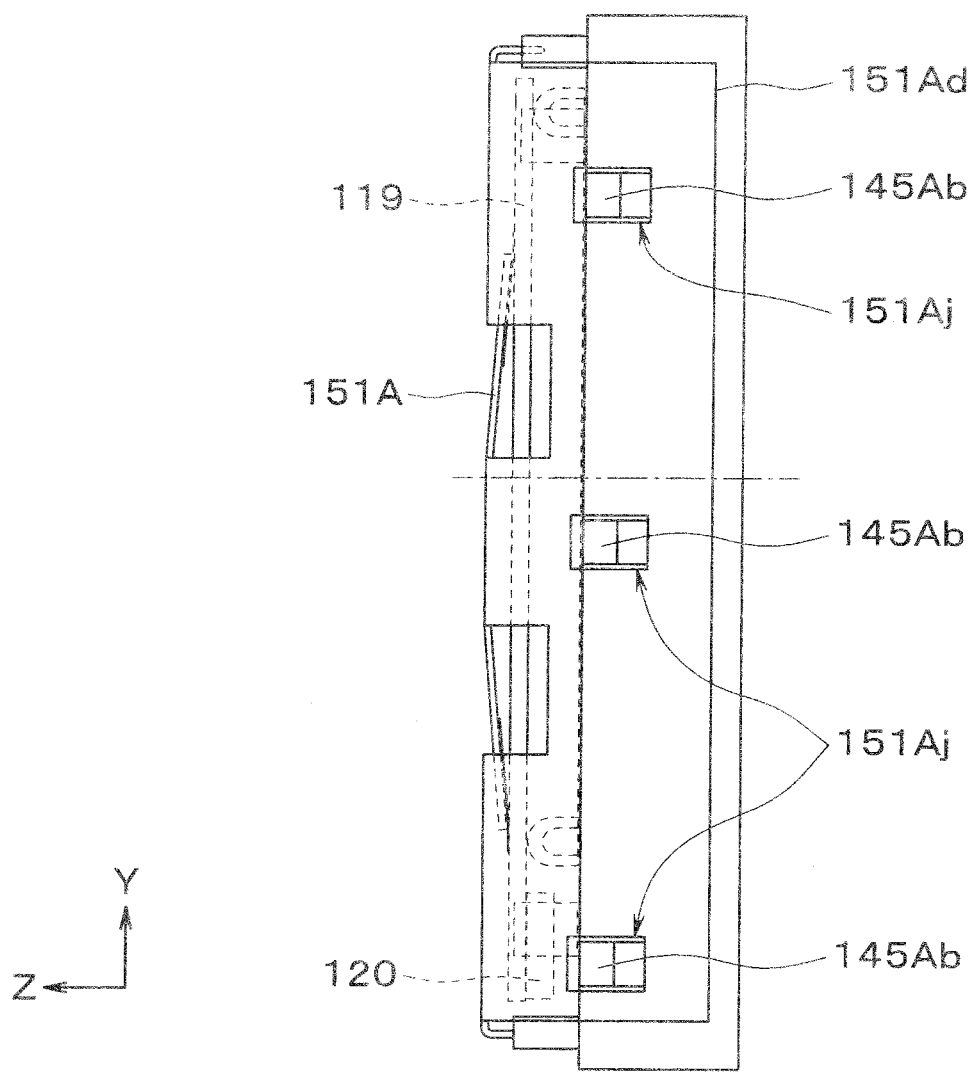
FIG. 21 is a right side view of the vibrating device shown in FIG. 19.
Figure 22:
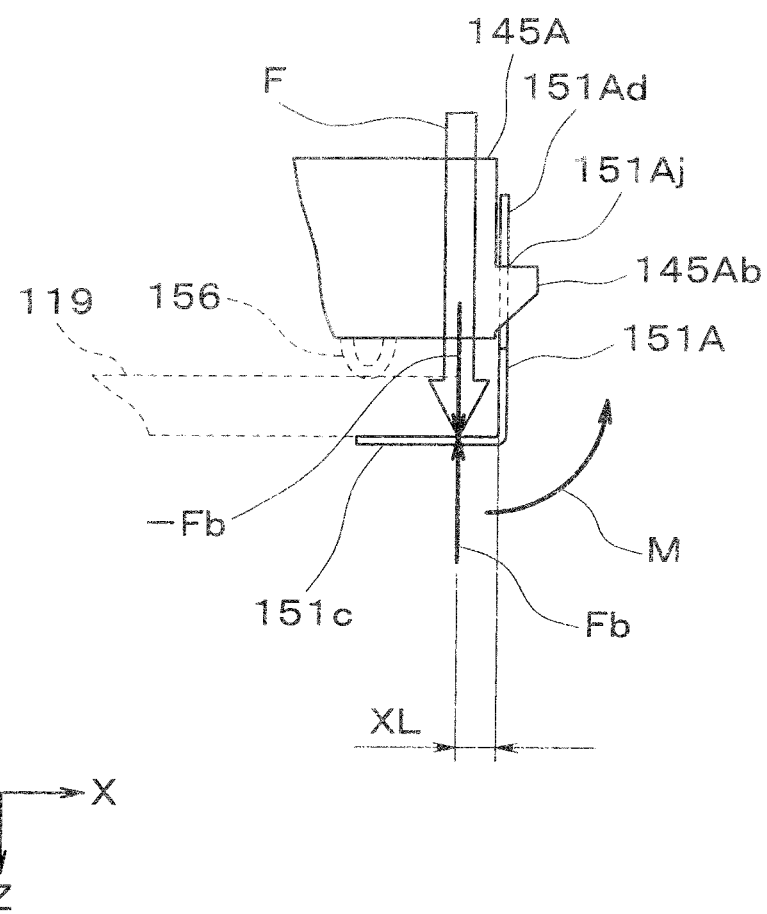
FIG. 22 is a partial sectional view for explaining action of a supporting section performed when an external force is applied to a pressing member of the vibrating device shown in FIG. 19.

FIGS. 19, 20, 21, and 22 are diagrams showing main portion of the vibrating device according to the second embodiment of the present invention. FIG. 19 is a front view of the main portion of the vibrating device. FIG. 20 is a left side view of FIG. 19. FIG. 21 is a right side view of FIG. 19. FIG. 22 is a conceptual diagram for explaining a force applied to the pressing member 151 when an external force is applied to the pressing member 151 and is a partial sectional view for explaining action of supporting sections.

In the vibrating device according to the second embodiment, structure for attaching a pressing member 151A to a holder 145A is mainly different from the structure in the first embodiment. In the first embodiment, as explained with reference to FIG. 3, the plurality of fixing sections 151d extended to the outer peripheral side of the pressing member 151 are fixed to the holder 145 using the screws 150.

On the other hand, in the present embodiment, in the pressing member 151A, a plurality of cutouts 151Aj are provided in fixing sections 151Ad extending in the optical axis O direction (the Z direction). Protrusions 145Ab of the holder 145A provided in positions corresponding to the cutouts 151Aj are engaged in the cutouts 151Aj. The arm supporting sections 151a, the arms 151b, and the supporting sections 151c are substantially the same as those in the first embodiment. Therefore, explanation thereof is omitted.

In a state in which the pressing member 151A is attached to the holder 145A, the pressing member 151A easily shifts in the Y direction because the pressing member 151A is only held by receiving, in the Z direction, a pressing force Fb generated by the arms 151b as shown in FIG. 22. Therefore, after the pressing member 151A is attached, it is desirable to bond and fix portions of the cutouts 151Aj and the protrusions 145Ab engaged with each other. Naturally, the fixing sections 151Ad may be fixed to the holder 145A by screws or the like.

When an external force F is applied to the vibrating device according to the second embodiment, as shown in FIG. 22, a moment M due to the external force F is generated. The moment M is equal to XL·F. XL is a distance between the external force F and the fixing sections 151Ad of the pressing member 151A. That is, XL is a distance from contact points of the supporting sections 151c and the dust-proof filter 119. XL is set such that a large external force F can be supported. More specifically, as explained in the first embodiment, when XL=0.5 mm and an external force is 49 N, the moment M is equal to 24.5 mm·N. When the moment M is applied, in the case of the second embodiment, a force in a direction for more deeply engaging with the protrusions 145Ab is generated in the cutouts 151Aj to prevent the cutouts 151Aj from coming off the protrusions 145Ab. It goes without saying that cutouts may be provided in the holder 145A and protrusions may be provided in the pressing member 151A.

In the second embodiment configured as explained above, an effect same as the effect of the first embodiment can be obtained.

The present invention is explained above on the basis of the embodiments. However, the present invention is not limited to the embodiments. It goes without saying that various modifications and applications can be carried out without departing from the spirit of the invention.

For example, besides the dust removing mechanism by the vibration-applying member, a system for removing the dust 79 of the dust-proof filter 119 using an airflow or a mechanism for removing the dust 79 of the dust-proof filter 119 using a wiper may be combined.

In the embodiments, the liquid crystal monitor is used as the finder. However, it goes without saying that the finder may be a single-lens reflex camera including an optical finder.

Further, in the embodiments, the image pickup device is the CCD. However, the image pickup device may be another image pickup device such as a CMOS.

A target to be applied vibration to is not limited to the illustrated dust-proof filter 119 and may be a member or the like present on an optical path and having light transparency (e.g., a cover glass or a half mirror). However, the member whisks off the dust 79 adhering to a surface of the member by vibrating. A frequency, a driving time, a setting position of a vibration-applying member, and the like related to the vibration are set to values corresponding to the member.

Further, the embodiments include inventions at various stages. Various inventions can be extracted according to appropriate combinations of a plurality of constituent features disclosed herein. For example, when the problem to be solved by the invention can be solved and the effect of the invention can be obtained even if several constituent features are deleted from all the constituent features explained in the one embodiment, a configuration in which the constituent features are deleted can be extracted as an invention.

In the respective processing sequences explained in the respective embodiments, a change of procedures can be allowed as long as the change is not against characteristics of the processing sequences. Therefore, concerning the processing sequences, for example, execution order of the respective processing steps may be changed, a plurality of the processing steps may be simultaneously executed, or order of the respective processing steps may be varied every time a series of the processing sequences is executed.

An imaging apparatus to which the present invention is applied is not limited to the illustrated image pickup apparatus (the digital camera) and only has to be an apparatus that requires a dust removing function. The apparatus can be put to practical use by being modified and carried out according to necessity. More specifically, the dust removing mechanism of the present invention may be provided between a display element and a light source or between the display element and a projection lens in an image projecting apparatus including the display element such as liquid crystal.

The present invention can also be applied to an electronic apparatus having a function of acquiring an image using an image pickup device and displaying the acquired image on a display device, for example, observation apparatuses such as a telescope, a binocular, and a microscope.

The present invention is not limited to the embodiments explained above. It goes without saying that various modifications and applications can be carried out without departing from the spirit of the invention. Further, the embodiments include inventions at various stages. Various inventions can be extracted according to appropriate combinations of a plurality of constituent features disclosed herein. For example, when the problem to be solved by the invention can be solved and the effect of the invention can be obtained even if several constituent features are deleted from all the constituent features explained in the one embodiment, a configuration in which the constituent features are deleted can be extracted as an invention. The present invention is not limited by a specific embodiment except being limited by appended claims.

What is claimed is:

1. A vibrating device comprising:
a transducer including a plate-like dust-proof member and a vibration-applying member arranged along an end side outer circumferential portion of the dust-proof member and configured to vibrate the dust-proof member;
a holder arranged a predetermined space apart from the dust-proof member;
a sealing member configured to seal the predetermined space between the dust-proof member and the holder; and
a pressing supporting member having formed therein pressing sections configured to elastically press the dust-proof member toward the sealing member, supporting sections for maintaining supporting of the dust-proof member or the vibration-applying member when an external force is applied to the dust-proof member in a direction opposite to a direction in which the dust-proof member is pressed by an elastic force of the pressing sections, and fixing sections configured to fix the pressing supporting member to the holder, wherein
the pressing sections are respectively provided in positions symmetrical to each other across an imaginary axis passing a center of gravity of the transducer, and rigidity of the supporting sections is set higher than rigidity of the pressing sections.

2. The vibrating device according to claim 1, wherein
the dust-proof member has at least one side bisected by an arbitrary axis of symmetry, and
the vibration-applying member is arranged in a position bisected by the arbitrary axis of symmetry on the dust-proof member.

3. The vibrating device according to claim 1, wherein positions of the pressing sections formed in the pressing supporting member are positions where a rotation moment of the imaginary axis passing the center of gravity of the transducer is balanced.

4. The vibrating device according to claim 2, wherein positions of the pressing sections formed in the pressing supporting member are positions where a rotation moment of the imaginary axis passing the center of gravity of the transducer is balanced.

5. The vibrating device according to claim 1, wherein the supporting sections have a spring constant 250 times or more as large as a spring constant of the pressing sections.

6. The vibrating device according to claim 1, wherein
the pressing sections and the supporting sections are formed in a frame-like shape as a whole, and the fixing sections are extended from a sidewall section and fixed by screws or elastically fixed to the holder, the sidewall section extending from one end portion of the frame-like shape while tilting at a predetermined angle.

7. The vibrating device according to claim 6, wherein the elastic fixing of the fixing sections and the holder is performed by a convex portion provided in one of the fixing sections and the holder and a concave portion provided in the other of the fixing sections and the holder.

8. The vibrating device according to claim 1, wherein an elastic receiving member made of a vibration absorptive material and configured to receive distal end portions of the pressing sections is arranged between the dust-proof member and the pressing sections.

9. An imaging apparatus comprising:
a dust-proof member in which a transparent region having a predetermined spread in a radial direction from a center of the region is formed;
a holder including an image pickup device configured to convert an object light beam made incident on the transparent region into image data or an image pickup device configured to convert image data into an object light beam and make the object light beam incident on the transparent region; and
a vibrating device, wherein
the vibrating device includes:
a transducer including a plate-like dust-proof member and a vibration-applying member arranged along an end side outer circumferential portion of the dust-proof member and configured to vibrate the dust-proof member;
a holder arranged a predetermined space apart from the dust-proof member;
a sealing member configured to seal the predetermined space between the dust-proof member and the holder; and
a pressing supporting member having formed therein pressing sections configured to elastically press the dust-proof member toward the sealing member, supporting sections for maintaining supporting of the dust-proof member or the vibration-applying member when an external force is applied to the dust-proof member in a direction opposite to a direction in which the dust-proof member is pressed by an elastic force of the pressing sections, and fixing sections configured to fix the pressing supporting member to the holder,
the pressing sections are respectively provided in positions symmetrical to each other across an imaginary axis passing a center of gravity of the transducer, and
rigidity of the supporting sections is set higher than rigidity of the pressing sections.

* * * * *